(12) United States Patent
Nagai et al.

(10) Patent No.: US 8,166,635 B2
(45) Date of Patent: May 1, 2012

(54) MANUFACTURING METHOD OF ELECTRODE, ELECTRIC STORAGE DEVICE, AND INTERMEDIATE LAMINATE MEMBER

(75) Inventors: Mitsuru Nagai, Tokyo (JP); Nobuo Ando, Tokyo (JP); Takashi Utsunomiya, Tokyo (JP); Yutaka Sato, Tokyo (JP); Ken Baba, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 562 days.

(21) Appl. No.: 12/410,609

(22) Filed: Mar. 25, 2009

(65) Prior Publication Data
US 2009/0246629 A1    Oct. 1, 2009

(30) Foreign Application Priority Data

Mar. 28, 2008  (JP) ................................. 2008-088240
Jun. 6, 2008   (JP) ................................. 2008-149022

(51) Int. Cl.
| | |
|---|---|
| *B23P 19/00* | (2006.01) |
| *H01M 4/82* | (2006.01) |
| *H01M 6/00* | (2006.01) |
| *H01B 13/00* | (2006.01) |
| *H01M 4/02* | (2006.01) |
| *H01M 4/64* | (2006.01) |
| *H01M 4/72* | (2006.01) |
| *H01M 4/74* | (2006.01) |

(52) U.S. Cl. ............. 29/730; 29/623.1; 216/13; 216/17; 216/18; 429/209; 429/233; 429/241

(58) Field of Classification Search .................. 29/623.1, 29/730; 216/17
See application file for complete search history.

(56) References Cited

U.S. PATENT DOCUMENTS

| | | | |
|---|---|---|---|
| 6,461,769 B1 | 10/2002 | Ando et al. | |
| 6,885,545 B2 * | 4/2005 | Michel et al. | 361/502 |
| 2002/0013986 A1 * | 2/2002 | Ahn et al. | 29/2 |
| 2007/0002523 A1 * | 1/2007 | Ando et al. | 361/503 |
| 2009/0242507 A1 * | 10/2009 | Ando et al. | 216/18 |

FOREIGN PATENT DOCUMENTS

| | | |
|---|---|---|
| JP | 3485935 B2 | 1/2004 |
| JP | 2007-141897 A | 6/2007 |

* cited by examiner

*Primary Examiner* — Jill Warden
*Assistant Examiner* — Charles D Hammond
(74) *Attorney, Agent, or Firm* — McDermott Will & Emery LLP

(57) ABSTRACT

In a current collector laminating step, a current-collector laminate unit 30 composed of current-collector materials 31 and 32 and a film material 33 is formed. Resist layers 34 having a predetermined pattern are formed on both surfaces of the current-collector laminate unit 30. An etching process is performed with the resist layers 34 used as a mask, whereby through-holes 20a and 23a are formed on the respective current-collector materials 31 and 32. The resist layers 34 are removed from the current-collector laminate unit 30. Since the etching process is performed on the plural current-collector materials 31 and 32, productivity of an electrode can be enhanced. During the application of the slurry, the film material 33 prevents the leakage of the electrode slurry. Therefore, the current-collector laminate unit 30 can be conveyed in the horizontal direction, whereby the productivity of the electrode can be enhanced.

7 Claims, 30 Drawing Sheets

FIG. 5A  Current collector laminating step
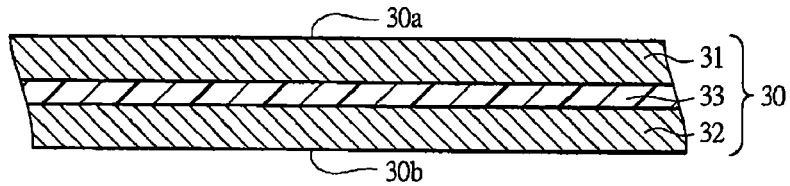
FIG. 5B  Resist printing step
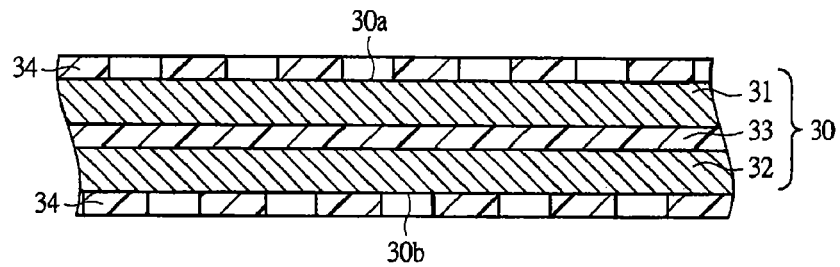
FIG. 5C  Etching step
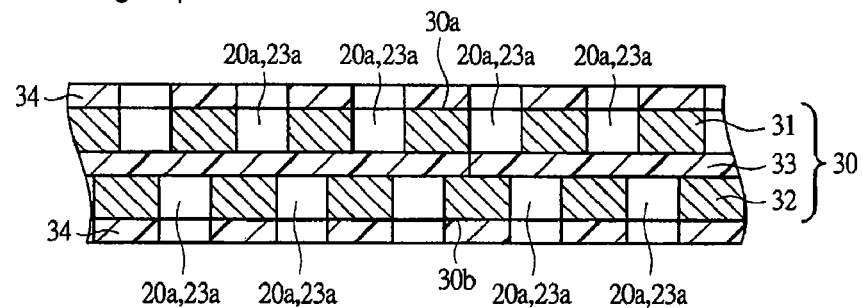
FIG. 5D  Resist removing step
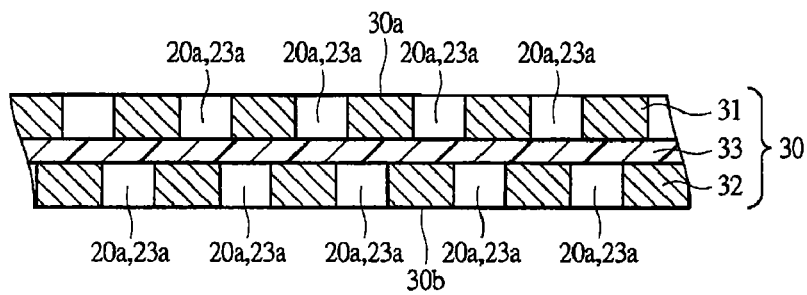
20a,23a : Through-holes
30 : Current-collector laminate unit
31,32 : Current-collector laminate material
33 : Film material (block layer)
34 : Resist layer (protection layer)

FIG. 6A  First slurry application step: Electrode A
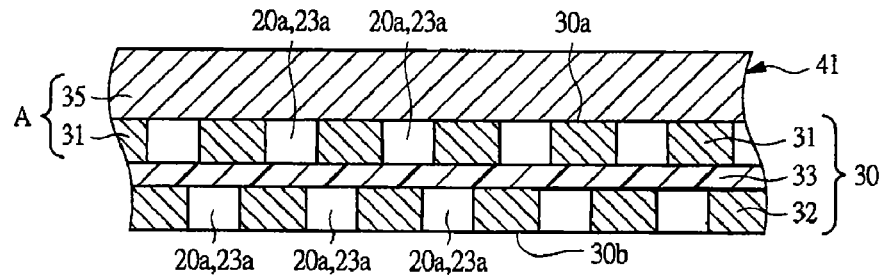
FIG. 6B  First slurry application step: Electrode B
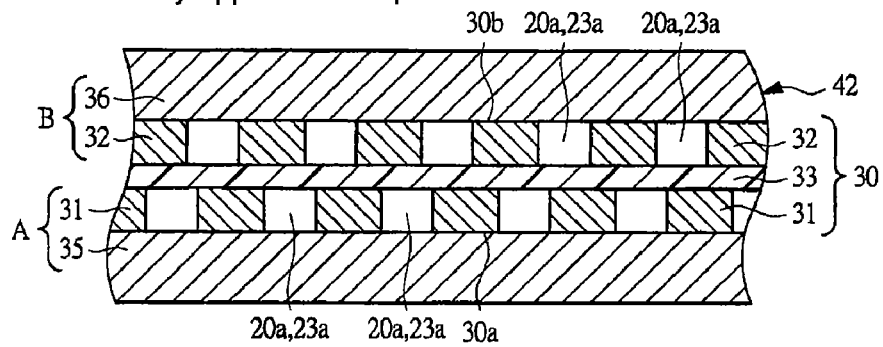
FIG. 6C  Current collector separating step
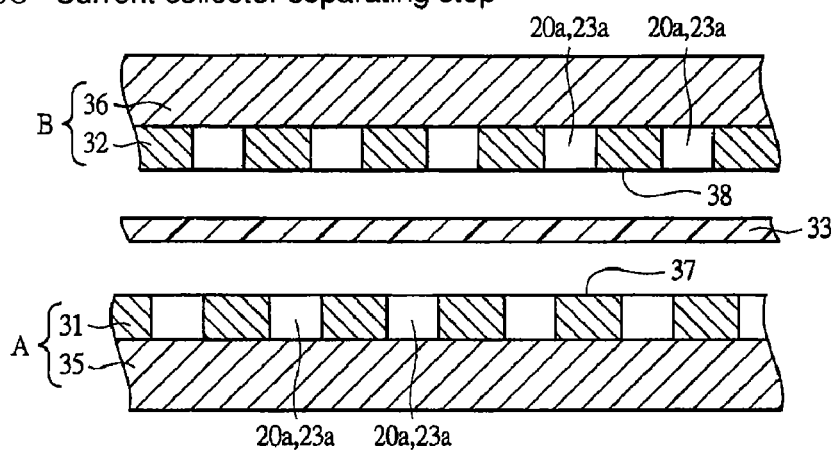
FIG. 6D  Second slurry application step: Electrodes A, B
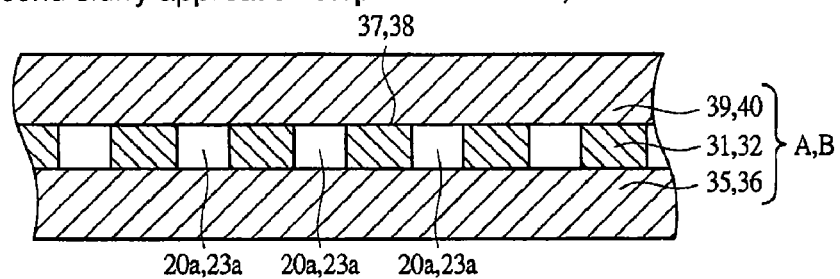

FIG. 9A  Current collector laminating step
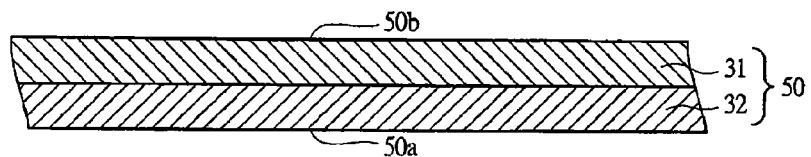
FIG. 9B  Film attaching step
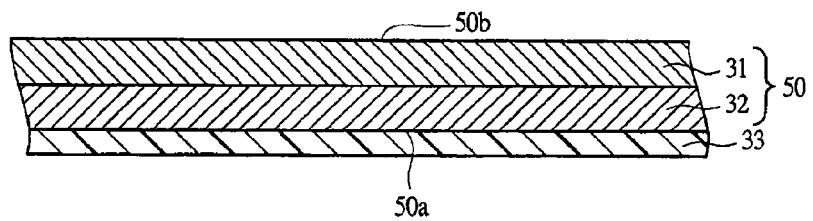
FIG. 9C  Resist printing step
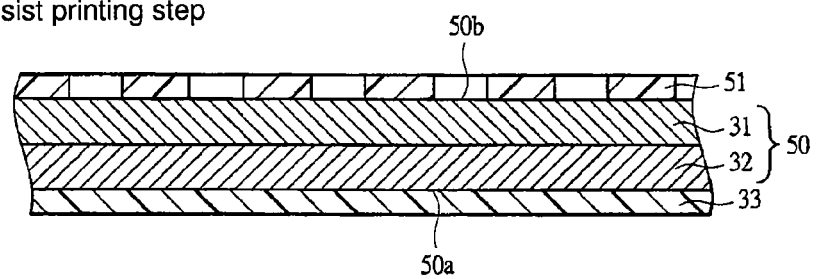
FIG. 9D  Etching step
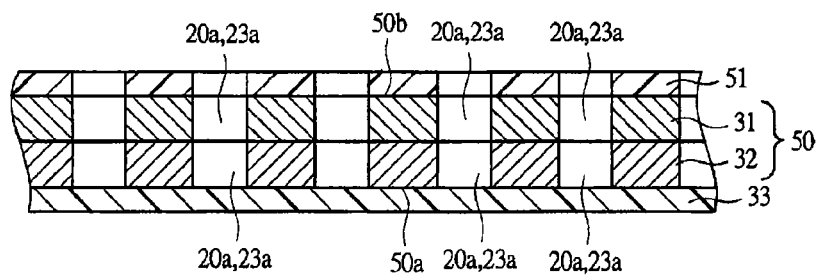
FIG. 9E  Resist removing step
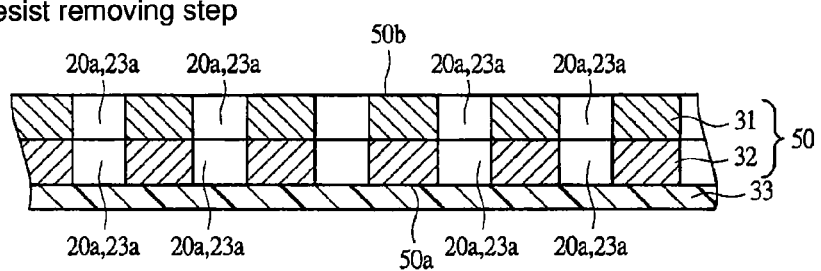

FIG. 10A  First slurry application step: Electrode A
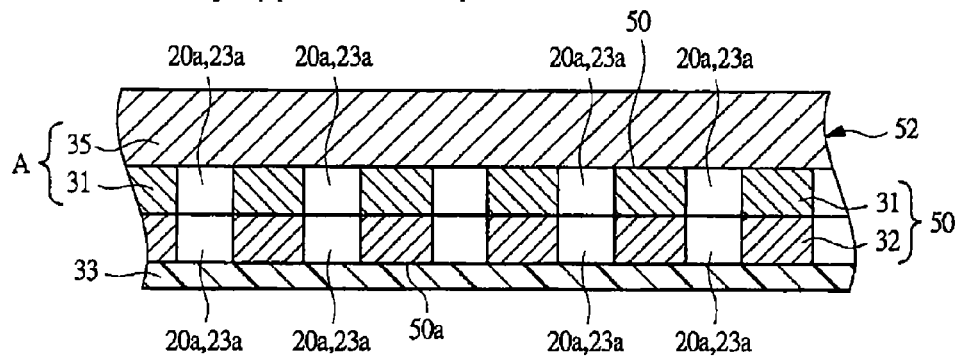
FIG. 10B  Current collector separating step
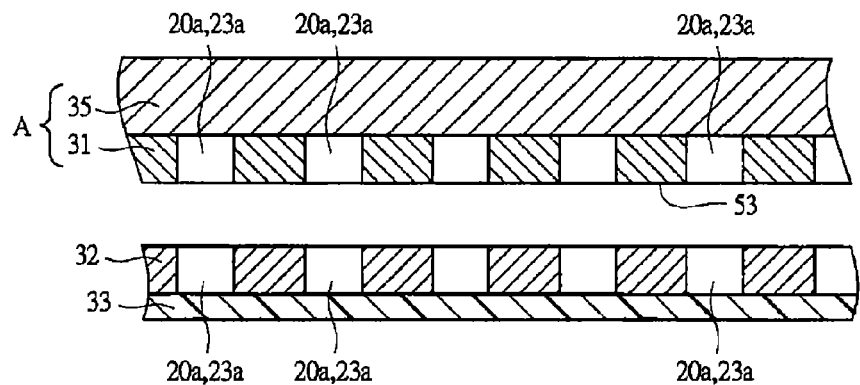
FIG. 10C  Second slurry application step: Electrode A
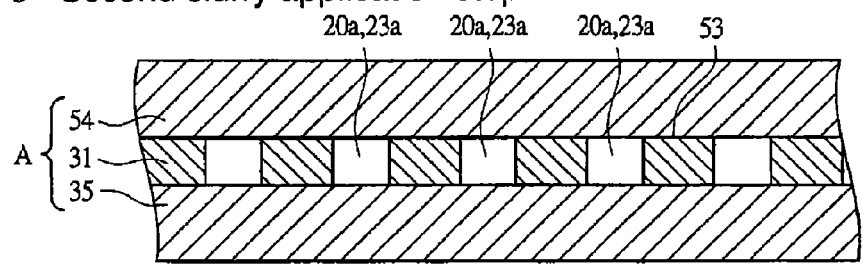

FIG. 11A  First slurry application step: Electrode B
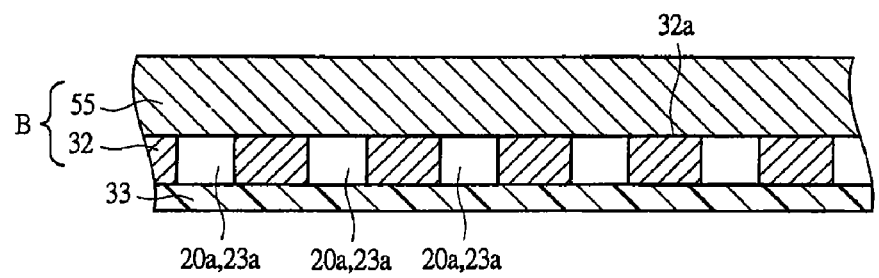
FIG. 11B  Film separating step
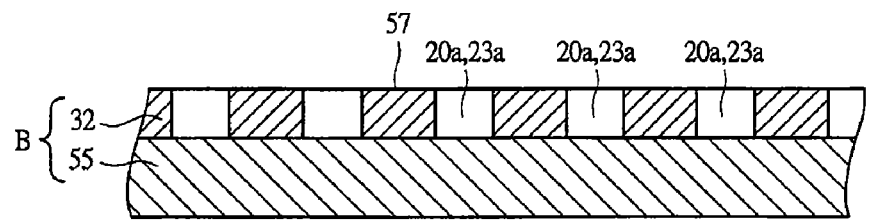
FIG. 11C  Second slurry application step: Electrode B
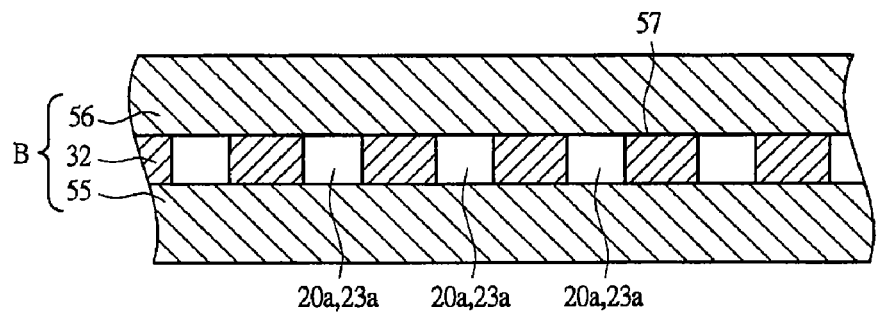

FIG. 12A  Current collector laminating step
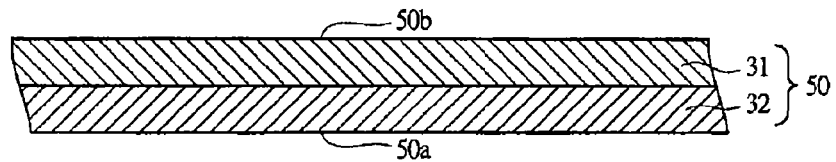
FIG. 12B  Resist printing step
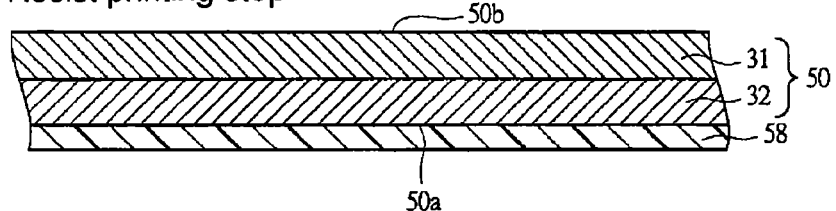
FIG. 12C  Resist printing step
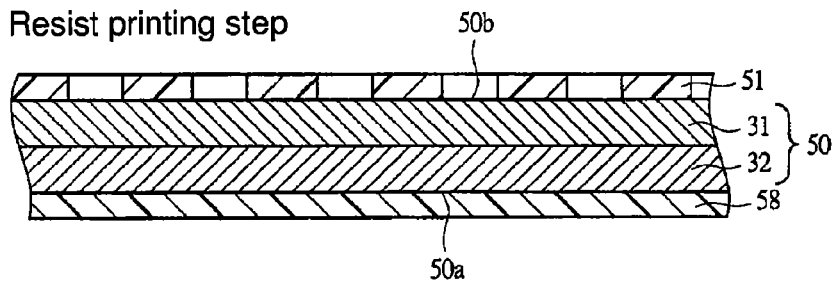
FIG. 12D  Etching step
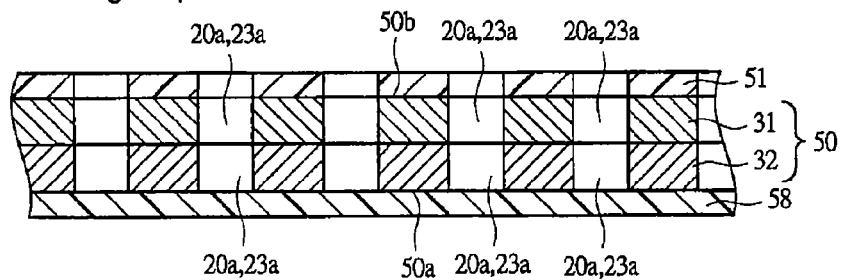
FIG. 12E  Resist removing step
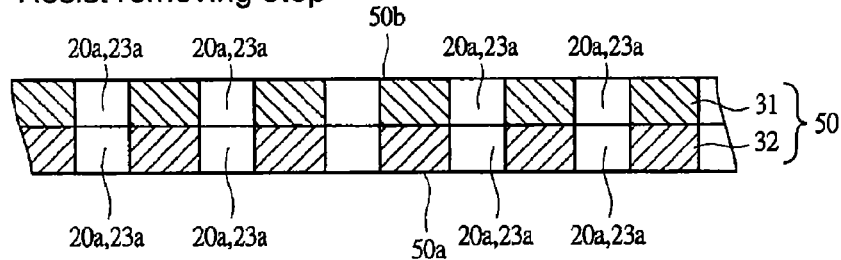

20a: Through-hole
23a: Through-hole
31: Current-collector material
32: Current-collector material α: Open surface
β: Open surface D>d FIG. 25
(A) First slurry application step: Electrode A
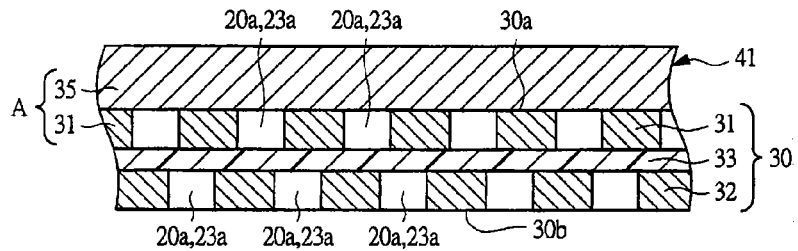
(B) First slurry application step: Electrode B
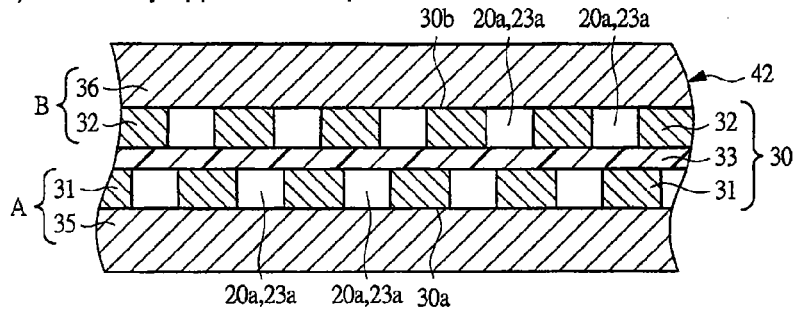
(C) Current collector separating step
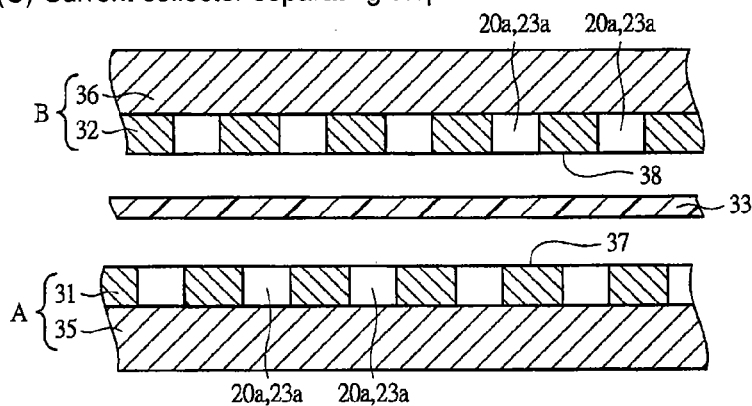
(D) Second slurry application step: Electrodes A, B
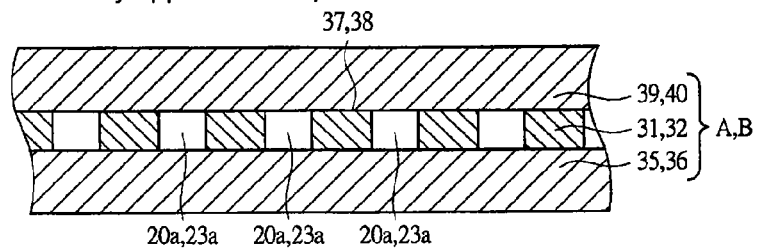

FIG. 26
(A) First slurry application step: Electrode A
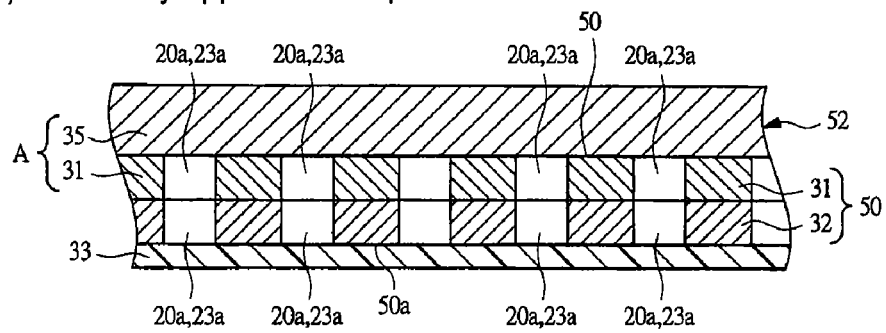
(B) Current collector separating step
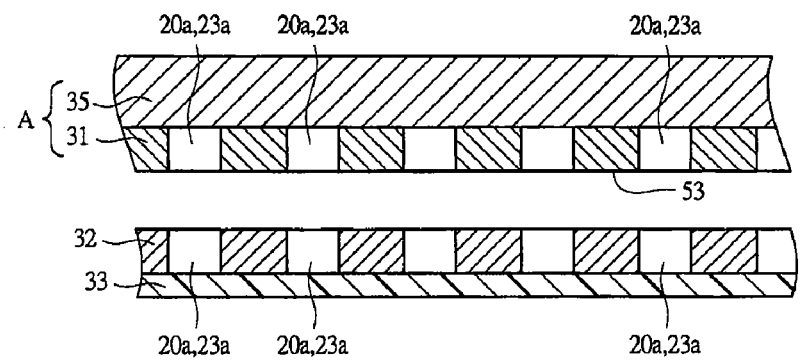
(C) Second slurry application step: Electrode A
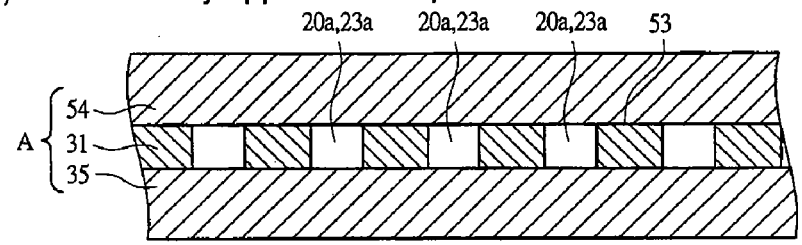

FIG. 27
(A) First slurry application step: Electrode B
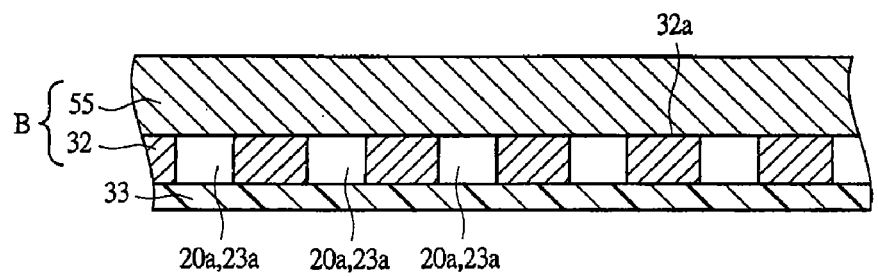
(B) Film separating step
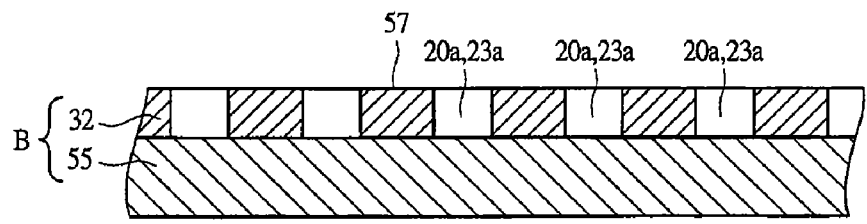
(C) Second slurry application step: Electrode B
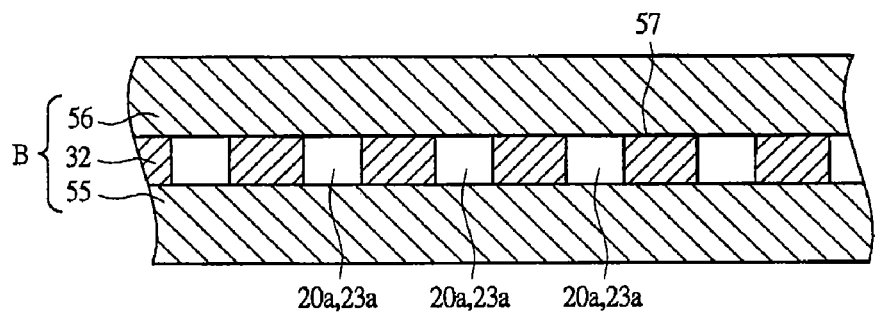

20a, 23a: Through-hole
31: Current-collector material
35a: Electrode mixture layer portion $\theta$: Drop-side open surface
$\theta 1$: Filled-side open surface

MANUFACTURING METHOD OF ELECTRODE, ELECTRIC STORAGE DEVICE, AND INTERMEDIATE LAMINATE MEMBER

CROSS-REFERENCE TO RELATED APPLICATIONS

The present application claims priority under 35 U.S.C. §119 to Japanese Patent Application No. 2008-088240 filed on Mar. 28, 2008 and Japanese Patent Application No. 2008-149022 filed on Jun. 6, 2008, and which is hereby incorporated by reference herein it its entirety.

BACKGROUND OF THE INVENTION

1. Field of the Invention

The present invention relates to a manufacturing method of an electrode having a perforated current collector, an electric storage device having incorporated therein an electrode provided with a perforated electrode, and an intermediate laminate member that is a work-in-process during a manufacturing method of an electrode.

2. Description of the Related Arts

An electric storage device, such as a lithium ion battery or a lithium ion capacitor, is mounted on an electric vehicle or hybrid vehicle. When an electrode incorporated into an electric storage device is produced, an electrode slurry containing an active material is applied on a material of a current collector such as a metal foil. In general, the material of the current collector is conveyed in the horizontal direction so as to allow the material to pass through a drying furnace, whereby the electrode slurry is dried to form an electrode mixture layer.

An electric storage device has been proposed in which a metal lithium foil and a negative electrode are electrochemically in contact with each other in order to enhance an energy density of the electric storage device. In the electric storage device described above, lithium ions can be doped beforehand into the negative electrode. Thus, the potential of the negative electrode can be lowered, and the capacitance of the negative electrode can be increased. Therefore, the energy density of the electric storage device can be enhanced. Through-holes, through which the lithium ions pass, are formed on the current collector of each electrode in order to uniformly dope the lithium ions into the laminated plural negative electrodes (see Japanese Patent No. 3485935).

When the electrode slurry is applied onto the current-collector material having the through-holes formed thereon, the electrode slurry might pass through the through-holes to reach the backside of the current-collector material. If the electrode slurry passes through the through-holes to reach the backside of the current-collector material, the electrode is deposited onto a guide roller that supports the current-collector material. In view of this, a manufacturing method has been proposed in which the current-collector material is lifted up in the vertical direction so as to apply the electrode slurry thereon. According to this manufacturing method, a guide roller is unnecessary during the process of lifting up the current-collector material, so that the deposition of the electrode slurry onto the guide roller can be prevented. Further, there has been proposed an electric storage device in which small through-holes are formed in the current-collector material in order to prevent the electrode slurry from passing through the through-holes to reach the backside of the current-collector material (see, JP-A No. 2007-141897).

Japanese Patent No. 3411514 discloses a configuration in which metal foils, which are provided at both sides sandwiching a bonding layer or an insulating layer, are subject to an etching process with the use of a resist having a predetermined pattern, so as to form holes.

However, lifting up the current-collector material in the vertical direction entails the decrease in the conveying speed, which unfavorably lowers productivity of the electrode. Specifically, it is necessary to lift up the current-collector material in the vertical direction until the electrode slurry applied onto the current-collector material is dried. However, the current-collector material might be broken by its own weight, so that the limitation is imposed on the lifting height of the current-collector material. With the limitation on the lifting height, the limitation is also imposed on the height of the drying furnace used for drying the electrode slurry. It is necessary to decrease the conveying speed of the current-collector material in order to dry the electrode slurry with such a short drying furnace. As described above, lifting up the current-collector material in the vertical direction lowers the productivity of the electrode as well as increases the production cost.

When the through-holes are made smaller in order to prevent the electrode slurry from passing through the through-holes to reach the backside of the current-collector material, the electrode slurry can be applied while conveying the current-collector material in the horizontal direction. However, since the strength of the current-collector material provided with the through-holes is lower than the strength of the current-collector material having no through-holes formed thereon, the conveying speed of the current collector provided with the through-holes tends to be set lower than the conveying speed of the current-collector material having no through-holes formed thereon. Even if the horizontal conveyance is made possible by the formation of the through-holes having smaller diameter, it is difficult to enhance productivity of the electrode compared to the case of the current-collector material having no through-holes formed thereon. Moreover, since the through-holes of the current collector become smaller, the moving speed of the lithium ions is lowered when the lithium ions are doped into the negative electrode. The lowering of the moving speed causes a long-term doping operation of the lithium ions into the negative electrode. The long-term doping operation deteriorates productivity of the electric storage device as well as increases production cost thereof.

There are mechanical process such as pressing and chemical process such as etching as a method for forming through-holes in the current-collector material. From the viewpoint of quality, the current-collector material is preferably subject to etching. When an etching process is performed, it is general that a resist layer having a predetermined pattern is formed on a front surface of an individual metal foil, and a resist layer is formed on the entire back surface of the individual metal foil. The formation of the resist layer on each metal foil so as to perform the etching process deteriorates productivity of a current collector, and further, deteriorates productivity of an electrode.

SUMMARY OF THE INVENTION

The present invention aims to enhance productivity of an electrode provided with a perforated current collector.

According to a first aspect of the present invention, a manufacturing method of an electrode according to the present invention is a manufacturing method of an electrode provided with a perforated current collector, the manufacturing method including a current collector laminating step in which plural current-collector materials are laminated on either of both and any of the surfaces of a block layer so as to form a current-collector laminate unit; a protection layer formation step for forming a protection layer having a predetermined pattern on the front surface of the current-collector laminate unit; an etching step for performing an etching process on the current-collector laminate unit having the protection layer formed thereon so as to form through-holes on each of the current-collector materials; a first application step in which an electrode slurry is applied onto the front surface of the current-collector laminate unit on which the through-holes are formed; a current collector peeling step in which the current-collector material having the electrode slurry applied thereon is peeled from the current-collector laminate unit; and a second application step in which an electrode slurry is applied onto the non-applied surface of the current-collector material separated from the current-collector laminate unit.

According to a second aspect of the present invention, in the manufacturing method of an electrode according to the present invention, the current-collector material is laminated on both the surfaces of a block layer in the current-collector laminating step, the protection layers having the predetermined pattern are formed on both the surfaces of the current-collector laminate unit in the protection layer formation step, and the through-holes are formed on each of the current-collector materials from both the surfaces of the current-collector laminate unit in the etching step.

According to a third aspect of the present invention, in the manufacturing method of an electrode according to the present invention, plural current-collector materials are directly laminated in the current collector laminating step, a block layer is formed over the entire surface of the current-collector laminate unit while the protection layer having the predetermined pattern is formed on the other surface of the current-collector laminate unit in the protection layer formation step, and the through-holes are formed on each of the current-collector materials from the surface of the current-collector laminate unit, on which the protection layer having the predetermined pattern is formed, in the etching step.

In any one of the manufacturing methods of an electrode according to the present invention, the through-holes formed on the respective laminated plural current-collector materials are formed so as to be opposite to each other, and the open surfaces of the through-holes formed so as to be opposite to each other are shifted from each other.

In any one of the manufacturing methods of an electrode according to the present invention, drop-preventer of the electrode mixture layer is provided at the inner surface of each of the through-holes formed on the respective plural laminated current-collector materials.

In any one of the manufacturing methods of an electrode according to the present invention, the drop-preventer is configured by forming the open surface at the end of the through-hole, which is at the side in the penetration direction of the through-hole from the side where the electrode slurry is applied, to be smaller than the other open surface of the through-hole on a hypothetical plane formed by cutting the through-hole in parallel with the open surface at the end of the through-hole.

In any one of the manufacturing methods of an electrode according to the present invention, the drop-preventer has a tapered shape from the open surface at the side where the electrode slurry is applied toward the other open surface of the through-hole.

The electric storage device according to the present invention has an electrode incorporated therein, the electrode being provided with a perforated current collector, wherein the electrode is produced by the manufacturing method of an electrode according to any one of claims 1 to 7.

The electric storage device according to the present invention is a lithium ion capacitor.

The electric storage device according to the present invention is a lithium ion battery.

An intermediate laminate member according to the present invention is an intermediate laminate member that is a work-in-process during a manufacturing method of an electrode, the intermediate laminate member including a current-collector material provided with plural through-holes; a block layer that is provided on one surface of the current-collector material so as to close the through-holes; and an electrode mixture layer provided on the other surface of the current-collector material.

In the intermediate laminate member having the above-mentioned configuration, the current-collector material is laminated on both surfaces of the blocking layer.

In the intermediate laminate member having the above-mentioned configuration, the current-collector material is laminated on one surface of the blocking layer.

In the intermediate laminate member having the above-mentioned configuration, the plural current-collector materials are provided on both sides of the blocking layer, and the open surfaces, which face the blocking layer, of the through-holes that are formed on the respective current-collector materials are shifted from each other.

In the intermediate laminate member having the above-mentioned configuration, the through-hole is provided with drop-preventer of the electrode mixture layer on its inner surface.

In the intermediate laminate member having the above-mentioned configuration, the drop-preventer is configured by forming the open surface facing the blocking layer to be smaller than the other open surface of the through-hole on a hypothetical plane formed by cutting the through-hole in parallel with the open surface.

In the intermediate laminate member having the above-mentioned configuration, the drop-preventer has a tapered shape formed so as to direct toward the blocking layer.

In the present invention, the etching process is performed on the plural current-collector materials, whereby productivity of a perforated current collector can be enhanced, and productivity of an electrode can be enhanced. Since the electrode slurry is applied onto the current-collector laminate unit having the plural current-collector materials laminated, the conveying speed in applying the electrode slurry can be increased, so that the productivity of the electrode can be enhanced.

BRIEF DESCRIPTION OF THE DRAWINGS

FIGS. 5A to 5D are schematic views, each showing a state of an electrode during each manufacturing method;

FIGS. 6A to 6D are schematic views, each showing a state of an electrode during each manufacturing method;

FIGS. 9A to 9E are schematic views, each showing a state of an electrode during each manufacturing method;

FIGS. 10A to 10C are schematic views, each showing a state of an electrode during each manufacturing method;

FIGS. 11A to 11C are schematic views, each showing a state of an electrode during each manufacturing method;

FIGS. 12A to 12E are schematic views, each showing a manufacturing method for forming through-holes on the current-collector material;

FIG. 15A is an explanatory view illustrating the case in which the opposing open surfaces agree with each other, while

FIG. 16A illustrates a plane pattern of the open surface, while

FIG. 24A is an explanatory view illustrating the modification of the case in which the opposing open surfaces agree with each other, while

FIGS. 25A-D are schematic views illustrating the case in which the electrode slurry is filled in the through-hole in FIG. 6;

FIGS. 26A-C are schematic views illustrating the case in which the electrode slurry is filled in the through-hole in FIG. 10;

FIGS. 27A-C are schematic view illustrating the case in which the electrode slurry is filled in the through-hole in FIG. 11;

DETAILED DESCRIPTION OF THE PREFERRED EMBODIMENTS

Embodiment 1

Figure 1:
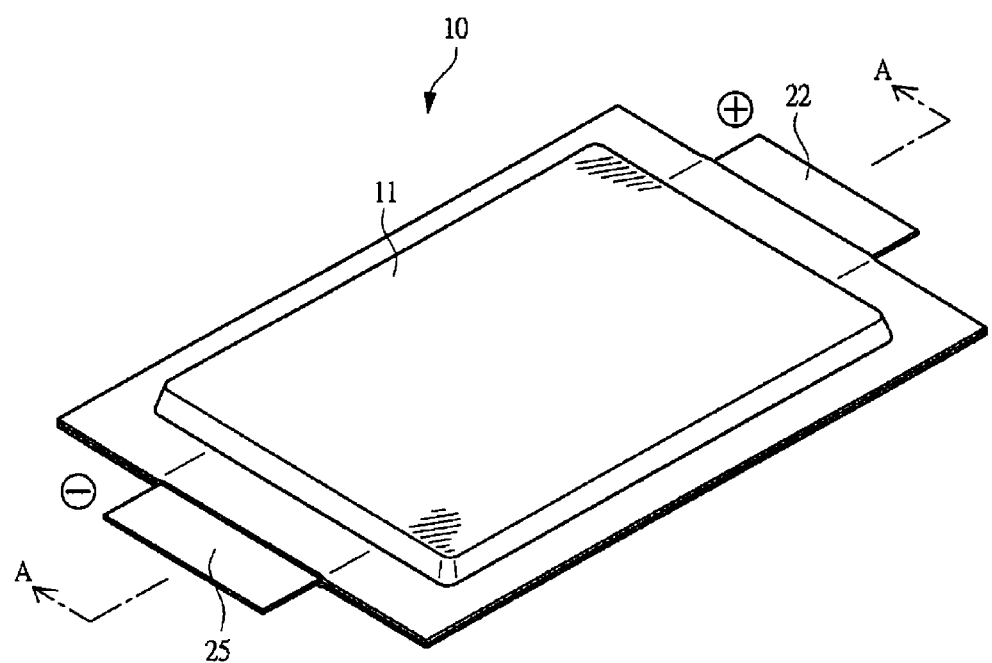
FIG. 1 is a perspective view of an electric storage device.
Figure 2:
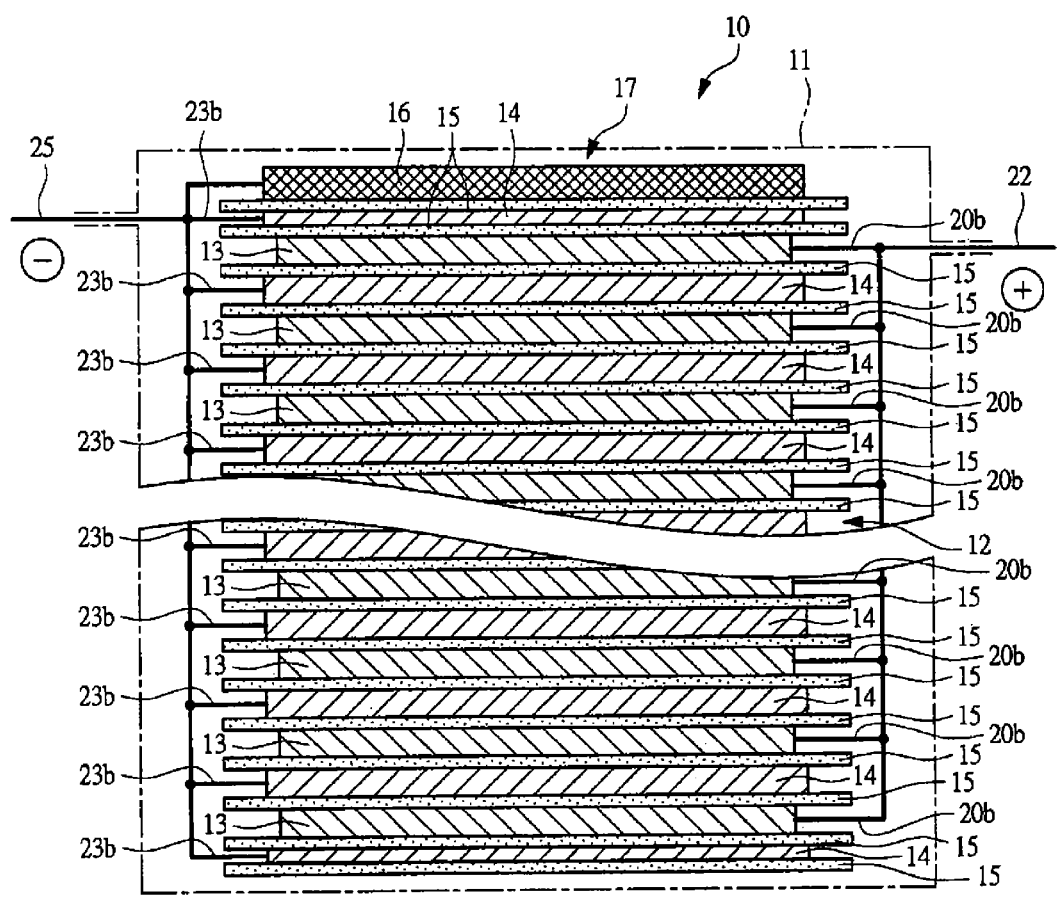
FIG. 2 is a sectional view schematically showing the internal configuration of the electric storage device along A-A line in FIG. 1.

FIG. 1 is a perspective view showing an electric storage device 10 according to one embodiment of the present invention. FIG. 2 is a sectional view schematically showing an internal configuration of the electric storage device 10 taken along a line A-A in FIG. 1. As shown in FIGS. 1 and 2, an electrode laminate unit 12 is accommodated in a laminate film 11 serving as an outer casing of the electric storage device 10. The electrode laminate unit 12 is composed of positive electrodes 13 and negative electrodes 14 that are laminated alternately. A separator 15 is interposed between each of the positive electrodes 13 and each of the negative electrodes 14. A lithium electrode 16 is arranged at the outermost part of the electrode laminate unit 12 so as to be opposite to the negative electrode 14. The separator 15 is provided between the negative electrode 14 and the lithium electrode 16. The electrode laminate unit 12 and the lithium electrode 16 constitute a three-electrode laminate unit 17. An electrolyte solution is injected into the laminate film 11. The electrolyte solution is made of aprotic organic solvent containing lithium salt.

Figure 3:
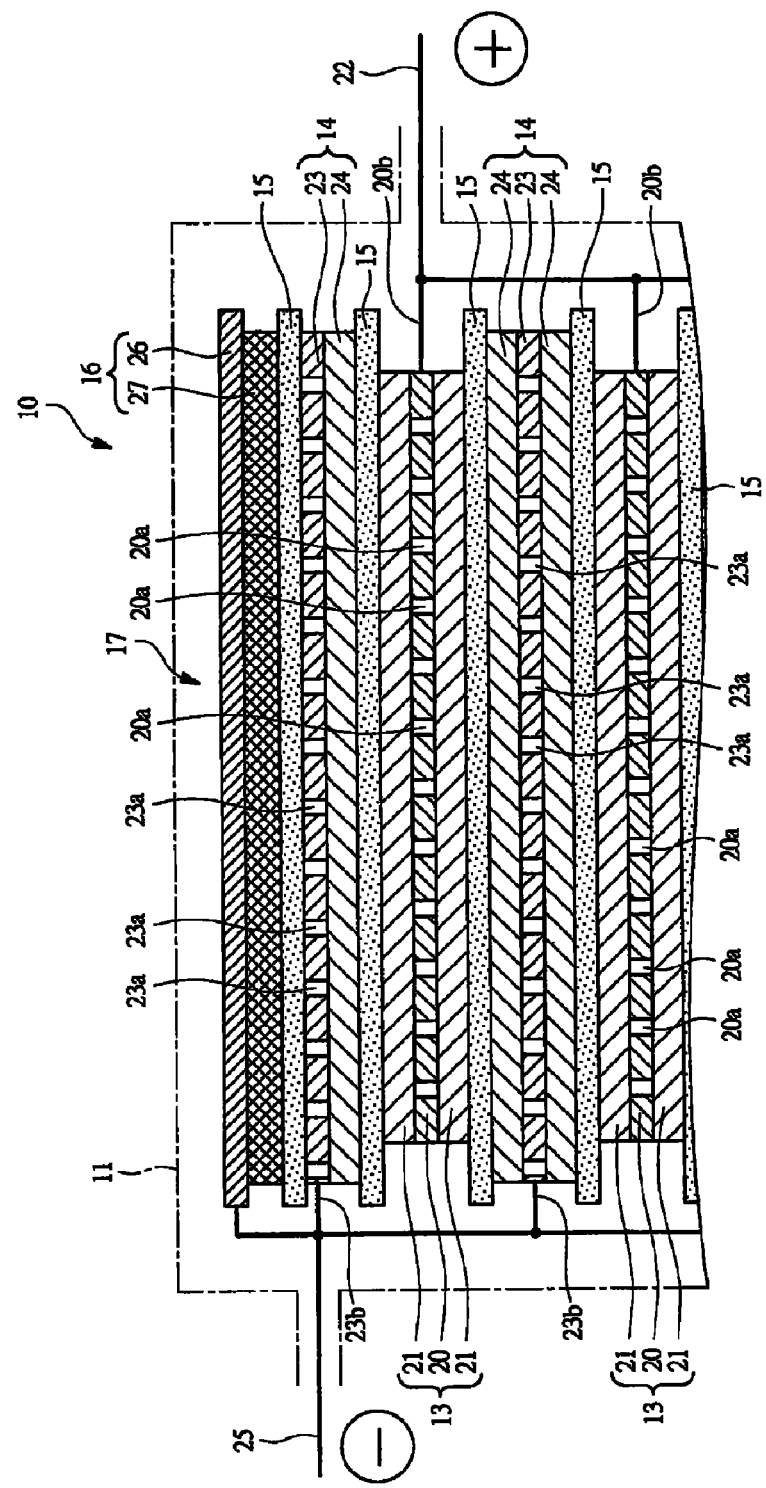
FIG. 3 is a sectional view showing the internal configuration of the electric storage device as partially enlarged.

FIG. 3 is a sectional view partially showing the internal configuration of the electric storage device 10 as enlarged. As shown in FIG. 3, each of the positive electrodes 13 has a positive electrode current collector (perforated current collector) 20 having a large number of through-holes 20a. A positive electrode mixture layer 21 is applied onto the positive electrode current collector 20. Terminal welding parts 20b extending convexly are provided to the positive electrode current collectors 20. Plural terminal welding parts 20b are bonded to each other as superimposed. A positive electrode terminal 22 is connected to the bonded terminal welding parts 20b. Similarly, each of the negative electrodes 14 has a negative electrode current collector 23 having a large number of through-holes 23a. A negative electrode mixture layer (electrode mixture layer) 24 is applied onto the negative electrode current collector 23. Terminal welding parts 23b extending convexly are provided to the negative electrode current collectors 23. Plural terminal welding parts 23b are bonded to each other as superimposed. A negative electrode terminal 25 is connected to the bonded terminal welding parts 23b.

The positive electrode mixture layer 21 contains an activated carbon as a positive electrode active material. The activated carbon allows lithium ions or anions to be reversibly doped thereinto and de-doped therefrom. The negative electrode mixture layer 24 contains a polyacene-based organic semiconductor (PAS) as a negative electrode active material. The PAS allows lithium ions to be reversibly doped thereinto and de-doped therefrom. Since the activated carbon is employed as the positive electrode active material and the PAS is employed as the negative electrode active material, the illustrated electric storage device 10 can function as a lithium ion capacitor. In the specification of the present invention, the term "doping (dope)" involves "occlude", "carry", "absorb" or "insert", and specifically a phenomenon where lithium ions and/or anions enter the positive electrode active material or the negative electrode active material. The term "de-doping (de-dope)" involves "release" and "desorb", and specifically a phenomenon where lithium ions or anions desorb from the positive electrode active material or the negative electrode active material.

As described above, the lithium electrode 16 is incorporated in the electric storage device 10. The lithium electrode 16 has a lithium electrode current collector 26 that is bonded to the negative electrode current collector 23. A metal lithium foil 27 serving as a lithium ion source is press-fitted to the lithium electrode current collector 26. Therefore, the metal lithium foil 27 and the negative electrode mixture layer 24 are connected via the lithium electrode current collector 26 and the negative electrode current collector 23. Thus, the negative electrode 14 and the lithium electrode 16 are electrically connected. Accordingly, when the electrolyte solution is injected into the laminate film 11, the lithium ions are doped (hereinafter referred to as "pre-dope") into the negative electrode 14 from the lithium electrode 16.

The potential of the negative electrode can be lowered by pre-doping the lithium ions into the negative electrode 14 as described above. Thereby, the cell voltage of the electric storage device 10 can be enhanced. The positive electrode 13 can deeply be discharged due to the lowering of the potential of the negative electrode, whereby the cell capacity (discharge capacity) of the electric storage device 10 can be enhanced. The electrostatic capacitance of the negative electrode 14 can be enhanced by pre-doping the lithium ions into the negative electrode 14. Thereby, the electrostatic capacitance of the electric storage device 10 can be enhanced. Since the cell voltage, the cell capacity, and the electrostatic capacitance of the electric storage device 10 can be enhanced as described above, the energy density of the electric storage device 10 can be increased. From the viewpoint of increasing the capacity of the electric storage device 10, the amount of the metal lithium foil 27 is preferably set such that the potential of the positive electrode after the positive electrode 13 and the negative electrode 14 are short-circuited becomes 2.0 V (vs. $Li/Li^+$) or less.

The positive electrode current collectors 20 and the negative electrode current collectors 23 are provided with the through-holes 20a and 23a. Therefore, the lithium ions emitted from the lithium electrode 16 can smoothly be moved in the laminating direction. Thus, the lithium ions can smoothly be pre-doped to all of the laminated negative electrodes 14.

Figure 4:
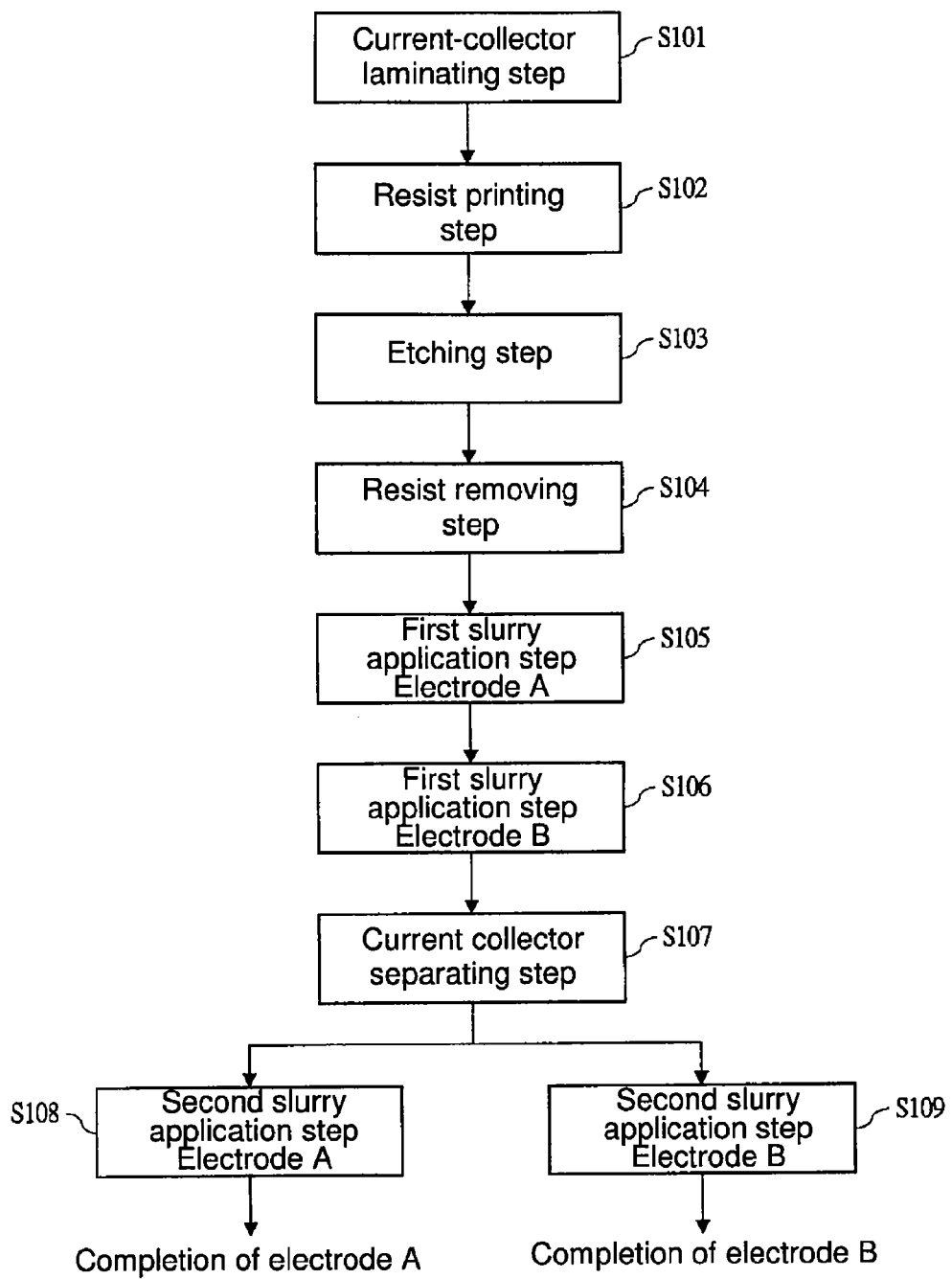
FIG. 4 is a flowchart showing a manufacturing method of an electrode according to one embodiment of the present invention.

Subsequently, a manufacturing method of the positive electrode 13 and the negative electrode 14 will be explained. In the description of the manufacturing method, the positive electrode 13 and the negative electrode 14 are described collectively as an electrode in order to explain the manufacturing method of the positive electrode 13 and the negative electrode 14 at once. In the description of the manufacturing method below, the positive electrode mixture layer 21 and the negative electrode mixture layer 24 are described as an electrode mixture layer. FIG. 4 is a flowchart showing a manufacturing method of an electrode according to one embodiment of the present invention. FIGS. 5 and 6 are schematic views showing a state of an electrode during each of the production steps.

As shown in FIG. 4, a current collector laminating step for forming a current-collector laminate unit 30 is executed at step S101. In the current collector laminating step, a long-sized current-collector materials 31 and 32 made of a metal foil are prepared, and a long-sized film material 33 is prepared as a block layer that blocks an electrode slurry or etching solution as shown in FIG. 5A. The film material 33 is sandwiched between a pair of the current-collector materials 31 and 32 so as to form the current-collector laminate unit 30 made of the current-collector materials 31 and 32 and the film material 33. When the positive electrodes 13 are manufactured, an aluminum foil is used as the current-collector materials 31 and 32, for example. On the other hand, when the negative electrodes 14 are manufactured, a copper foil is used as the current-collector materials 31 and 32, for example. A material having resistance to later-described etching solution is used for the film material 33. It is preferable that a slightly adhesive film or peelable film is used for the film material 33 in order to cope with a later-described current-collector peeling step. For example, REVALPHA (registered trademark, made by Nitto Denko) can be used as a film that can be peeled through the application of heat. PANAPROTECT (registered trademark, made by Panac) can be used as a slightly adhesive film.

As shown in FIG. 4, a resist printing step (protection layer formation step) for forming resist layers 34 serving as a protection layer on the current-collector laminate unit 30 is executed at the next step S102. In the resist printing step, resist ink is printed on both of one surface 30a and the other surface 30b of the current-collector laminate unit 30 with a predetermined pattern as shown in FIG. 5B. Thus, the resist layers 34 having the predetermined pattern are formed on both of the surface 30a and the surface 30b of the current-collector laminate unit 30. In the resist printing step, the resist ink is printed by gravure printing or screen printing. It is preferable that the film material 33 serving as the block layer is present because it is unnecessary to match both patterns. Ordinary ink can be used as the resist ink, so long as it has resistance to the etching solution. An ink that can be dissolved and removed by alkali solvent is preferably used as the resist ink.

In the above-mentioned description, the resist layer 34 is formed by using liquid resist ink. However, a dry film resist, which is formed into a film beforehand, can be applied. For example, FXR or FX900 made by DuPont MRC Dryfilm Ltd. can be used as the dry film resist. When the dry film resist is used, the applied dry resist film is subject to an exposure process and developing process so as to form the resist layer 34 having the predetermined pattern on the current-collector laminate unit 30.

As shown in FIG. 4, an etching step for forming the through-holes 20a and 23a in the current-collector laminate unit 30 is executed at the next step S103. In the etching step, the etching process is performed on the current-collector laminate unit 30 with the resist layers 34 used as a mask. Thus, a large number of through-holes 20a and 23a are formed on the current-collector materials 31 and 32 from both of the surface 30a and the surface 30b of the current-collector laminate unit 30. The etching solution used for the etching process is appropriately selected according to the type of the current-collector materials 31 and 32. When the aluminum foil or copper foil is used as the current-collector materials 31 and 32, aqueous solution of ferric chloride, sodium hydroxide, or hydrochloric acid can be used as the etching solution.

As shown in FIG. 4, at the next step S104, a resist removing step for removing the resist layers 34 from the current-collector laminate unit 30 is executed. In the resist removing step, the resist layers 34, which protect the non-etched section other than the through-holes 20a and 23a, are removed from the current-collector laminate unit 30 as shown in FIG. 5D. When the resist ink that can be dissolved into alkali solvent is used, the etching process is performed by hydrochloric acid or the like, cleaning is performed, and then the resist layers can be removed by using aqueous solution of sodium hydroxide. The current-collector laminate unit 30 is washed, neutralized, and washed, repeatedly, to dry the current-collector laminate unit 30, whereby the current-collector materials 31 and 32 having the through-holes 20a and 23a formed thereon are having the film material 33 sandwiched therebetween.

Since the etching process is simultaneously performed on the plural current-collector materials 31 and 32 as described above, the production cost of the positive electrode current collector 20 provided with the through-holes 20a or the negative electrode current collector 23 provided with the through-holes 23a can remarkably be lowered. The film material 33 that can block the etching solution is interposed between the current-collector materials 31 and 32, whereby the etching process is performed on each of the respective current-collector materials 31 and 32 from one of their surfaces on which the film material 33 is not provided. Therefore, it is unnecessary to match the pattern on the resist layer 34 formed on one surface of the current-collector laminate unit 30 to the pattern on the resist layers 34 formed on another surface of the current-collector laminate unit 30, with the result that the production cost of the positive electrode current collector 20 or the negative electrode current collector can be lowered.

Figure 7:
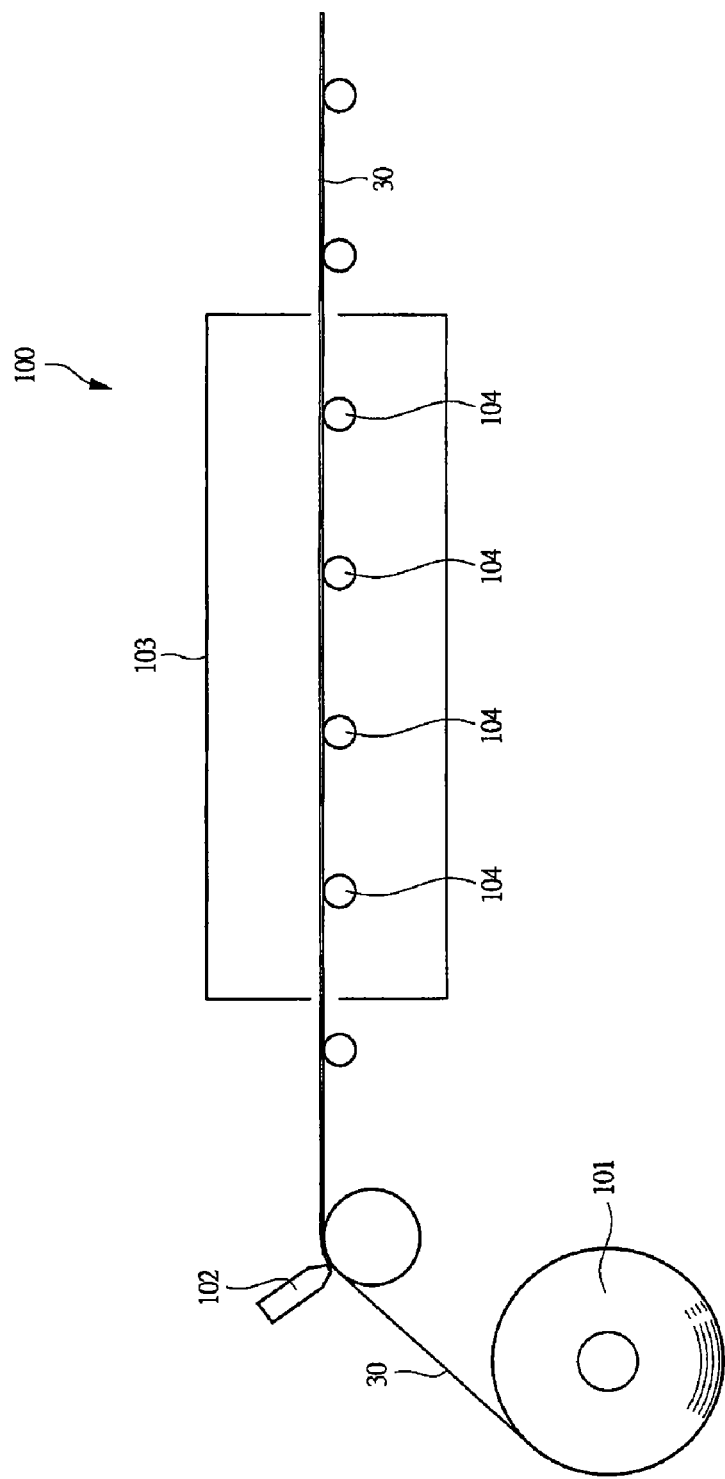
FIG. 7 is a schematic view showing one example of a coating/drying device.

Then, as shown in FIG. 4, a first slurry application step (first application step) for forming a first electrode mixture layer 35 on an electrode A, which is constituted by the current-collector material 31, is executed at step S105. In the first slurry application step, an electrode slurry is applied onto the surface 30a of the current-collector laminate unit 30 as shown in FIG. 6A. The electrode slurry can be applied so as to be filled in the through-holes 20a and 23a. The electrode mixture layer 35 is formed on the surface 30a of the current-collector laminate unit 30 by drying the electrode slurry. As described above, during the process of producing the electrode, an intermediate laminate member 41 serving as a work-in-process provided with the film material 33 for closing the through-holes 20a and 23a is formed. The intermediate laminate member 41 has the current-collector material 31 provided with the through-holes 20a and 23a, the film material 33 formed on one surface of the current-collector material 31, and the electrode mixture layer 35 formed on the other surface of the current-collector material 31. FIG. 7 is a schematic view showing one example of a coating/drying device 100. As shown in FIG. 7, the current-collector laminate unit that has been subject to the etching process and drawn from a roll 101 is guided to an application section 102 such as a die coater or the like. The electrode slurry is applied onto the current-collector laminate unit 30 at the application section 102. In order to dry the applied electrode slurry, the current-collector laminate unit 30 passes through a drying furnace 103 as being conveyed in the horizontal direction.

As described above, the film material 33 is provided between the current-collector materials 31 and 32. Therefore, even when the electrode slurry is applied onto the current-collector materials 31 and 32 having the through-holes 20a and 23a, there is no chance that the electrode slurry passes through the through-holes 20a and 23a to reach the backside of the current-collector laminate unit 30. Accordingly, the electrode slurry is not deposited onto guide rollers 104 or the like, whereby the current-collector laminate unit 30 can be conveyed in the horizontal direction. Thus, the drying furnace 103 can be set longer compared to the application method in which the current-collector material is lifted up in the vertical direction. Consequently, the conveying speed of the current-collector materials 31 and 32 can be increased, whereby the productivity of the electrode can be enhanced. The current-collector materials 31 and 32 having the through-holes 20a and 23a have strength lower than the strength of a current-collector material having no through-holes. Therefore, it is difficult to increase the conveying speed of the current-collector materials 31 and 32 having the through-holes 20a and 23a. On the other hand, the strength of the current-collector materials 31 and 32 can be increased by superimposing the current-collector materials 31 and 32 with the film material 33 sandwiched therebetween. Accordingly, the conveying speed of the current-collector materials 31 and 32 can be increased, whereby the productivity of the electrode can be enhanced.

As shown in FIG. 4, a first slurry application step for forming a first electrode mixture layer 36 on the electrode B that is constituted by the other current-collector material 32 is then executed at the next step S106. In the first slurry application step, an electrode slurry is applied onto the surface 30b of the current-collector laminate unit 30 that is vertically inversed, as shown in FIG. 6B. The electrode slurry can be applied so as to be filled in the through-holes 20a and 23a. The electrode mixture layer 36 is formed on the surface 30b of the current-collector laminate unit 30 by drying the electrode slurry. As described above, during the process of producing an electrode, an intermediate laminate member 42 serving as a work-in-process provided with the film material 33 for closing the through-holes 20a and 23a is formed. The intermediate laminate member 42 has the current-collector materials 31 and 32 provided with the through-holes 20a and 23a. The film material 33 is formed on one surface of the current-collector material 31, while the electrode mixture layer 35 is formed on the other surface of the current-collector material 31. Further, the film material 33 is formed on one surface of the current-collector material 32, while the electrode mixture layer 36 is formed on the other surface of the current-collector material 32. In the first slurry application step, the current-collector laminate unit 30 includes the film material 33 and the electrode mixture layer 35, so that there is no chance that the electrode slurry passes through the through-holes 20a and 23a to reach the backside of the current-collector laminate unit 30. Accordingly, the electrode mixture layer 36 can efficiently be formed while conveying the current-collector laminate unit 30 in the horizontal direction.

As shown in FIG. 4, at the next step S107, a current collector peeling step for peeling the current-collector materials 31 and 32 from the current-collector laminate unit 30 is executed. As shown in FIG. 6c, the current-collector materials 31 and 32 provided with the electrode mixture layers 35 and 36 are peeled from the film material 33 in the current collector peeling step. When a heat-peelable film is used as the film material 33, the current-collector materials 31 and 32 can easily be peeled, since the adhesion force of the heat-peelable film is lowered during when the current-collector laminate unit 30 passes through the drying furnace 103.

As shown in FIG. 4, a second slurry application step (second application step) for forming a second electrode mixture layer 39 on a non-applied surface 37 of the peeled current-collector material 31 is executed at the next step S108. Similarly, at step S109, the second slurry application step for forming a second electrode mixture layer 40 on a non-applied surface 38 of the peeled current-collector material 32 is executed. In the second slurry application step, the electrode slurry is applied on the non-applied surfaces 37 and 38 of the current-collector materials 31 and 32 with the electrode mixture layers 35 and 36 arranged downward as shown in FIG. 6D. The electrode slurry is dried so as to form the electrode mixture layers 39 and 40 on the non-applied surfaces 37 and 38 of the current-collector materials 31 and 32. In the second slurry application step also, the electrode mixture layers 35 and 36 are provided on the current-collector materials 31 and 32. Therefore, there is no chance that the electrode slurry passes through the through-holes 20a and 23a to reach the backside of the current-collector materials 31 and 32. Accordingly, the electrode mixture layers 39 and 40 can efficiently be formed while conveying the current-collector materials 31 and 32 in the horizontal direction.

As described above, the etching process is simultaneously performed on the plural current-collector materials 31 and 32, whereby the production cost of the positive electrode current collector 20 having the through-holes 20a and the negative electrode current collector 23 having the through-holes 23a can be lowered. The film material 33 is sandwiched between the current-collector materials 31 and 32. This configuration prevents the applied electrode slurry from passing through the through-holes 20a and 23a to reach the backside of the current-collector materials 31 and 32. Accordingly, the electrode slurry can be applied while conveying the current-collector materials 31 and 32 in the horizontal direction, whereby the productivity of the electrode can be enhanced, and the production cost can be lowered. Although the film material 33 is provided as the block layer, the invention is not limited thereto. For example, resist ink is applied between the current-collector materials 31 and 32 so as to provide a resist layer serving as the block layer between the current-collector materials 31 and 32.

Figure 8:
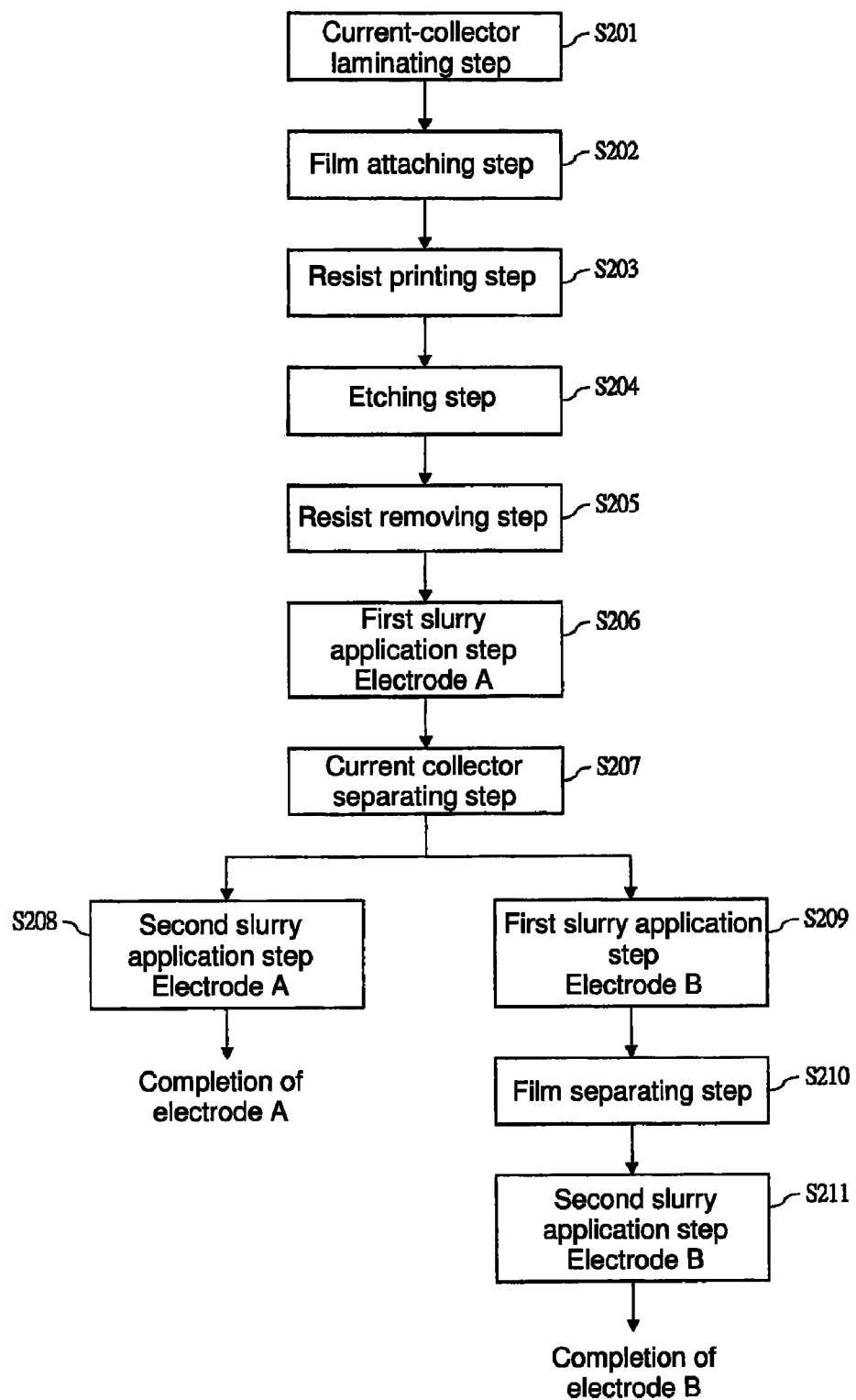
FIG. 8 is a flowchart showing a manufacturing method of an electrode according to another embodiment of the present invention.

Subsequently, a manufacturing method of an electrode according to another embodiment of the present invention will be explained. FIG. 8 is a flowchart showing a manufacturing method of an electrode according to another embodiment of the present invention. FIGS. 9 to 11 are schematic views, each showing a state of an electrode during each manufacturing method. The members same as those in FIGS. 5 and 6 are identified by the same numerals, and the description will not be repeated. The resist ink and the etching solution same as those described above will be employed.

As shown in FIG. 8, a current-collector laminating step for forming a current-collector laminate unit 50 is executed at step S201. In the current-collector laminating step, a pair of current-collector laminate materials 31 and 32 are directly laminated so as to form the current-collector laminate unit 50 as shown in FIG. 9A. Then, as shown in FIG. 8, a film attaching step for attaching the film material 33 serving as the block layer to the current-collector laminate unit 50 is executed at step S202. In the film attaching step, the film material 33 is attached over an entire surface 50a of the current-collector laminate unit 50 as shown in FIG. 9B. At step S203, a resist printing step for forming a resist layer 51, serving as a protection layer, onto the current-collector laminate unit 50 is executed. In the resist printing step, a resist layer 51 having a predetermined pattern is formed on the other surface 50b of the current-collector laminate unit 50 as shown in FIG. 9C. Thus, the protection layer formation step is executed by the film attaching step and the resist printing step.

As shown in FIG. 8, an etching step for forming the through-holes 20a and 23a in the current-collector laminate unit 50 is executed at the next step S203. In the etching step, the etching process is performed on the current-collector laminate unit 50 with the film material 33 and the resist layer 51 used as a mask as shown in FIG. 9D. Thus, a large number of through-holes 20a and 23a are formed on the current-collector materials 31 and 32 from the 50b surface of the current-collector laminate unit 50. Then, as shown in FIG. 8, at the next step S205, a resist removing step for removing the resist layer 51 from the current-collector laminate unit 50 is executed. In the resist removing step, the resist layer 51 formed on the 50b surface of the current-collector laminate unit 50 and having the predetermined pattern is removed as shown in FIG. 9E. Thus, the film material 33 that closes the through-holes 20a and 23a is formed on the current-collector materials 31 and 32 having the through-holes 20a and 23a.

Since the etching process is simultaneously performed on the plural current-collector materials 31 and 32 as described above, the production cost of the positive electrode current collector 20 provided with the through-holes 20a or the negative electrode current collector 23 provided with the through-holes 23a can remarkably be lowered. The film material 33 is attached to the current-collector laminate unit 50 so as to perform the etching process on the respective current-collector materials 31 and 32 from one surface. This eliminates the need for highly precise positioning of the pattern of the resist layer 51 having the current-collector laminate unit 50 formed thereon, with the result that the production cost of the positive electrode current collector 20 or the negative electrode current collector 23 can be lowered.

Then, as shown in FIG. 8, a first slurry application step (first application step) for forming a first electrode mixture layer 35 on the electrode A, which is constituted by the current-collector material 31, is executed at step S206. In the first slurry application step, an electrode slurry is applied onto the 50b surface of the current-collector laminate unit 50 as shown in FIG. 10A. The electrode slurry can be applied so as to be filled in the through-holes 20a and 23a. The electrode mixture layer 35 is formed on the 50b surface of the current-collector laminate unit 50 by drying the electrode slurry. As described above, during the process of producing an electrode, an intermediate laminate member 52 serving as a workin-process provided with the film material 33 for closing the through-holes 20a and 23a is formed. The intermediate laminate member 52 has the current-collector materials 31 and 32 having the through-holes 20a and 23a, the film material 33 formed on one surface of the current-collector materials 31 and 32, and the electrode mixture layer 35 formed on the other surface of the current-collector materials 31 and 32.

As described above, the film material 33 is attached over the entire surface of the current-collector laminate unit 50. Therefore, even when the electrode slurry is applied onto the current-collector materials 31 and 32 having the through-holes 20a and 23a, there is no chance that the electrode slurry passes through the through-holes 20a and 23a to reach the backside of the current-collector laminate unit 50. Accordingly, the electrode slurry is not deposited onto guide rollers 104 or the like, whereby the current-collector laminate unit 50 can be conveyed in the horizontal direction. Thus, the drying furnace 103 can be set longer compared to the application method in which the current-collector material is lifted up in the vertical direction. Consequently, the conveying speed of the current-collector materials 31 and 32 can be increased, whereby the productivity of the electrode can be enhanced. The current-collector materials 31 and 32 having the through-holes 20a and 23a have strength lower than the strength of a current-collector material having no through-holes. Therefore, it is difficult to increase the conveying speed of the current-collector materials 31 and 32 having the through-holes 20a and 23a. On the other hand, the strength of the current-collector materials 31 and 32 can be increased by superimposing the current-collector materials 31 and 32 and attaching the film material 33. Accordingly, the conveying speed of the current-collector materials 31 and 32 can be increased, whereby the productivity of the electrode can be enhanced.

As shown in FIG. 8, at the next step S207, a current collector peeling step for peeling the current-collector material 31 from the current-collector laminate unit 50 is executed. As shown in FIG. 10B, the current-collector material 31 provided with the electrode mixture layer 35 is peeled from the current-collector material 32 provided with the film material 33 in the current collector separating step. Next, a second slurry application step (second application step) for forming a second electrode mixture layer 54 on a non-applied surface 53 of the separated current-collector material 31 is executed at the next step S208. In the second slurry application step, the electrode slurry is applied on the non-applied surface 53 of the current-collector material 31 with the electrode mixture layer 35 arranged downward as shown in FIG. 10C. The electrode slurry can be applied so as to be filled in the through-holes 20a and 23a. The electrode slurry is dried, whereby the electrode mixture layer 54 is formed on the non-applied surface 53 of the current-collector material 31. In the second slurry application step, the electrode mixture layer 53 is formed on the current-collector material 31, so that there is no chance that the electrode slurry passes through the through-holes 20a and 23a to reach the backside of the current-collector material 31. Accordingly, the electrode mixture layer 54 can efficiently be formed while conveying the current-collector material 31 in the horizontal direction.

As shown in FIG. 8, at the next step S209, a first slurry application step for forming a first electrode mixture layer 55 on the electrode B that is constituted by the other current-collector material 32 is executed. In the first slurry application step, the electrode slurry is applied on the surface 32a of the current-collector material 32 with the film material 33 arranged downward as shown in FIG. 11A. The electrode slurry can be applied so as to be filled in the through-holes 20a and 23a. The electrode slurry is dried, whereby the electrode mixture layer 55 is formed on the current-collector material 32. In the first slurry application step, the film material 33 that closes the through-holes 20a and 23a is formed on the current-collector material 32, so that there is no chance that the electrode slurry passes through the through-holes 20a and 23a to reach the backside of the current-collector material 32. Accordingly, the electrode mixture layer 55 can efficiently be formed while conveying the current-collector material 32 in the horizontal direction.

As illustrated in FIG. 8, a film peeling process is executed at the subsequent step S210, wherein the film material 33 is removed from the current-collector material 32. In the film peeling process, the film material 33 left on the current-collector material 32 is removed as illustrated in FIG. 11B. Then, as illustrated in FIG. 8, a second slurry applying process is executed at step S211, wherein the second electrode mixture layer 56 is formed on the current-collector material 32. In the second slurry applying process, the electrode slurry is applied on the non-applied surface 57 of the current-collector material 32 with the electrode mixture layer 55 provided at the bottom as shown in FIG. 11C. The electrode slurry may be applied to be filled in the through-holes 20a and 23a. When the electrode slurry is dried, the electrode mixture layer 56 is formed on the non-applied surface 57 of the current-collector material 32. In the second slurry applying process also, the electrode mixture layer 55 is formed on the current-collector material 32. Therefore, there is no chance that the electrode slurry passes through the through-holes 20a and 23a to reach the backside of the current-collector material 32. Accordingly, the electrode mixture layer 56 can efficiently be formed while conveying the current-collector material 32 in the horizontal direction.

As described above, the etching process is simultaneously performed on the plural current-collector materials 31 and 32, whereby the production cost of the positive electrode current collector 20 having the through-holes 20a and the negative electrode current collector 23 having the through-holes 23a can be lowered. The film material 33 is provided to the current-collector laminate unit 50. This configuration prevents the applied electrode slurry from passing through the through-holes 20a and 23a to leak. Accordingly, the electrode slurry can be applied while conveying the current-collector materials 31 and 32 in the horizontal direction, whereby the productivity of the electrode can be enhanced, and the production cost can be lowered.

Although the film material 33 is attached over the entire 50a surface of the current-collector laminate unit 50, the resist layer can be formed over the entire 50a surface of the current-collector laminate unit 50 from the viewpoint of simultaneously performing the etching process on the plural current-collector materials. FIGS. 12A to 12E are schematic views, each showing a manufacturing method for forming through-holes on the current-collector material. The members same as those in FIG. 9 are identified by the same numerals, and the description will not be repeated. The resist ink and the etching solution same as those described above will be employed.

As shown in FIG. 12A, a pair of current-collector materials 31 and 32 is directly laminated so as to form the current-collector laminate unit 50. As shown in FIG. 12B, resist ink is printed over the entire surface 50a of the current-collector laminate unit 50. As shown in FIG. 12C, resist ink is printed on the other surface 50b of the current-collector laminate unit 50 with a predetermined pattern. Thus, a resist layer 58 is formed over the entire 50a surface of the current-collector laminate unit 50. On the other hand, a resist layer 51 having a predetermined pattern is formed on the other surface 50b of the current-collector laminate unit 50.

Then, as shown in FIG. 12D, the etching process is performed on the current-collector laminate unit 50 with the resist layers 51 and 58 used as a mask. Thus, a large number of through-holes 20a and 23a are formed on the respective current-collector materials 31 and 32 from the 50b surface of the current-collector laminate unit 50. As shown in FIG. 12E, the resist layer 58 printed over the entire 50a surface of the current-collector laminate unit 50 is removed. Further, the resist layer 51, which is formed on the 50b surface of the current-collector laminate unit 50 and has the predetermined pattern, is removed. Therefore, the current-collector materials 31 and 32 having the through-holes 20a and 23a can be obtained.

Since the etching process is simultaneously performed on the plural current-collector materials 31 and 32 as described above, the production cost of the positive electrode current collector 20 provided with the through-holes 20a or the negative electrode current collector 23 provided with the through-holes 23a can remarkably be lowered. Since the resist layer 58 is provided on the current-collector laminate unit 50, the etching process is performed on the respective current-collector materials 31 and 32 from one side. Thus, it is unnecessary to position the pattern of the resist layer 51, which is formed on the current-collector laminate unit 50, with high precision, with the result that the production cost of the positive electrode current collector 20 and the negative electrode current collector 23 can be lowered.

Figure 13:
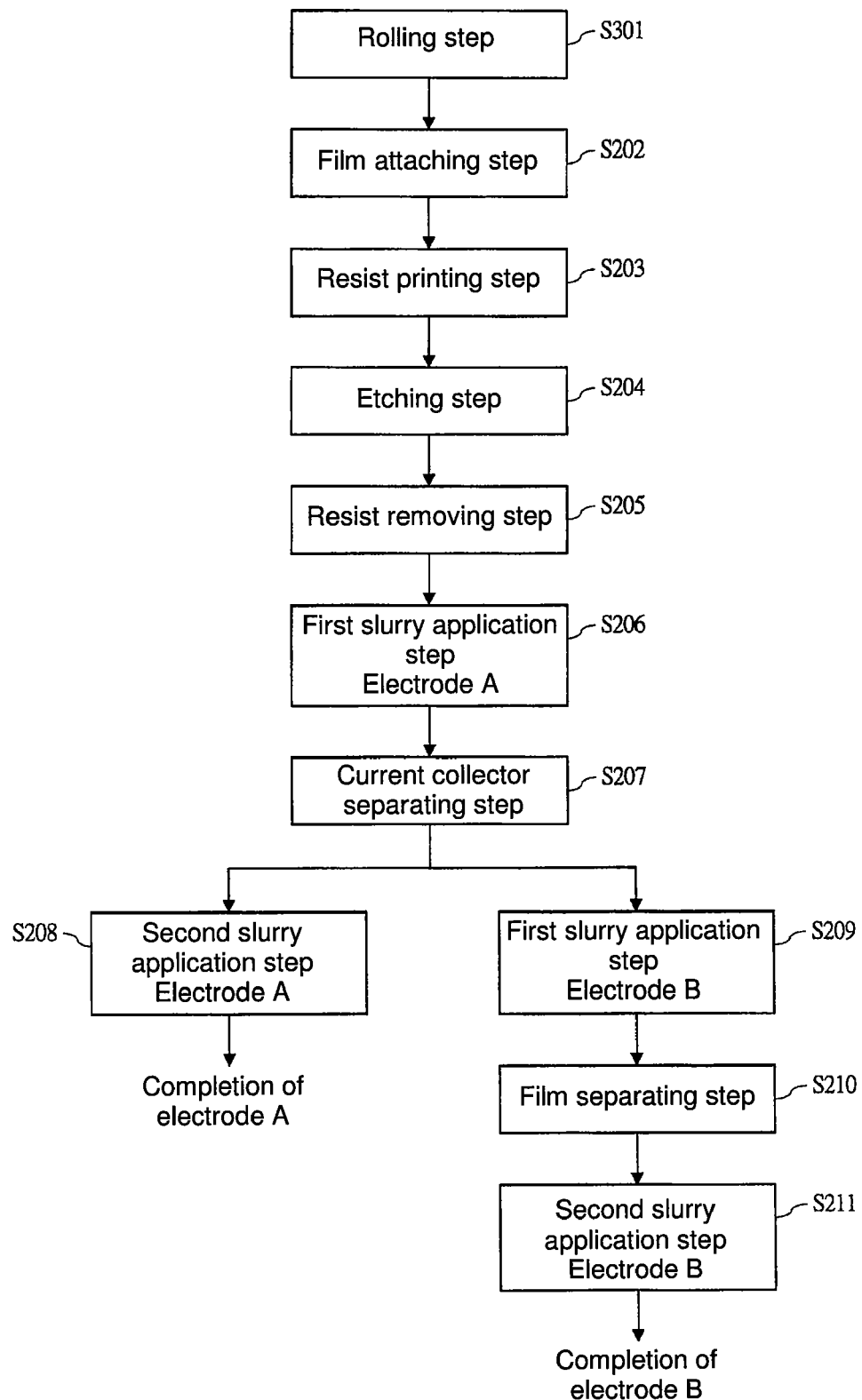
FIG. 13 is a flowchart showing a manufacturing method of an electrode according to another embodiment of the present invention.

Subsequently, a manufacturing method of an electrode according to still another embodiment of the present invention will be explained. FIG. 13 is a flowchart showing the manufacturing method of an electrode according to still another embodiment of the present invention. The processes same as those in FIG. 8 are identified by the same numerals, and the description will not be repeated.

Figure 14:
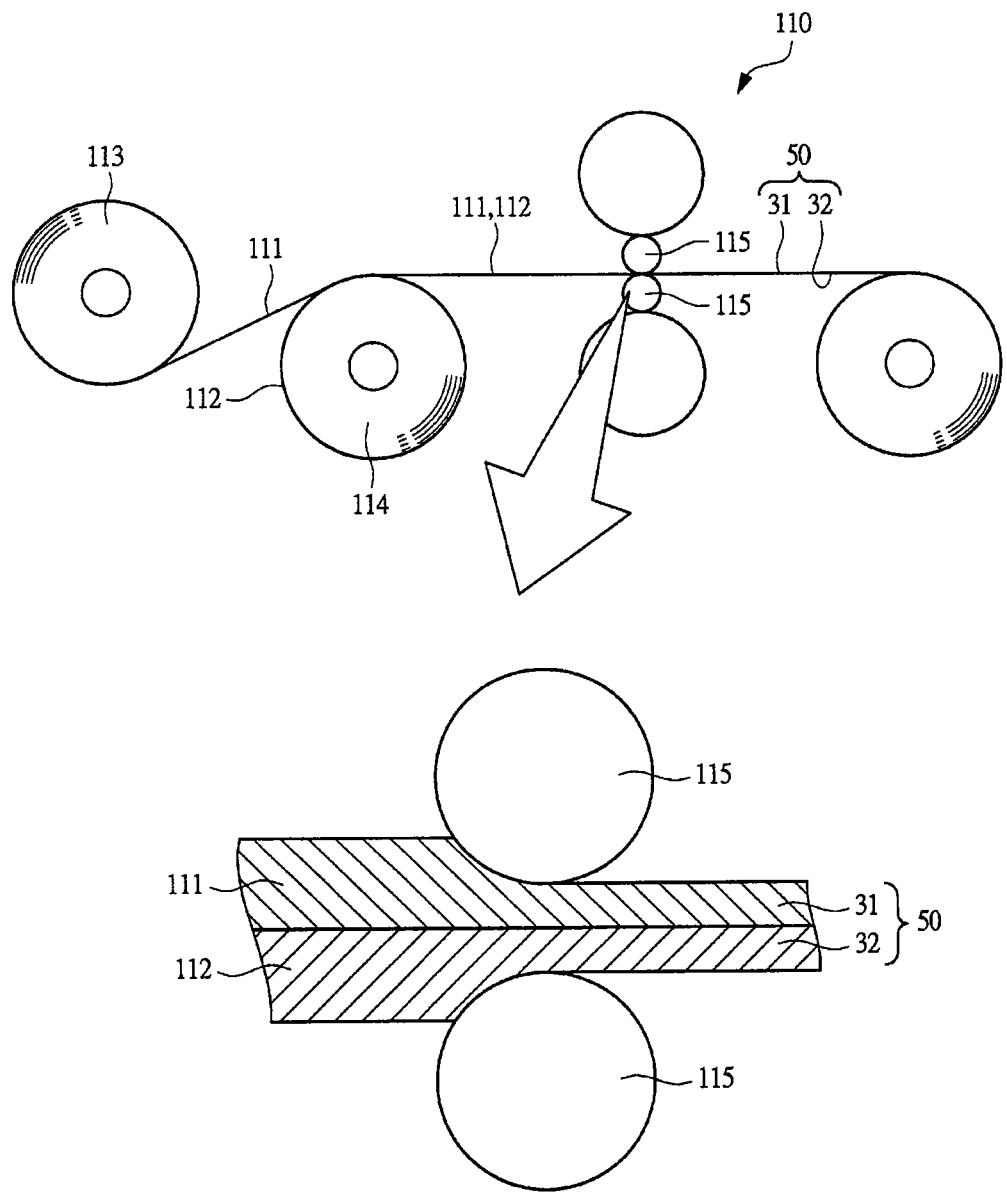
FIG. 14 is a schematic view showing one example of a rolling device.

As shown in FIG. 13, a pack rolling step (current collector laminating step) for forming the current-collector laminate unit 50 is executed at step S301. FIG. 14 is a schematic view showing one example of a rolling device 110. As shown in FIG. 14, the pack rolling device 110 has two rolls 113 and 114 from which metal foil materials 111 and 112 are drawn. The pack rolling device 110 further includes a pair of rolling rollers 115 for rolling the metal foil materials 111 and 112. The metal foil materials 111 and 112 drawn from the rolls 113 and 114 are guided to the rolling rollers 115 as superimposed with each other. The metal foil materials 111 and 112 are pack-rolled by the rolling rollers 115, whereby the current-collector materials 31 and 32 can be formed from the metal foil materials 111 and 112, and the current-collector laminate unit 50 in which the current-collector materials 31 and 32 are directly laminated is obtained. The current-collector laminate unit 50 obtained by the rolling is subject to the resist printing step, etching step, and resist removing step described above, so that the current-collector materials 31 and 32 having the through-holes 20a and 23a can be obtained.

The production cost of the positive electrode current collector having the through-holes 20a and the negative electrode current collector having the through-holes 23a can remarkably lowered by utilizing the current-collector materials 31 and 32, which are pack-rolled as superimposed, as the current-collector laminate unit 50. Specifically, the pack rolling step that is required to produce the current-collector materials 31 and 32 can also serve as the current-collector laminating step for forming the current-collector laminate unit 50. Accordingly, the manhour for producing the positive electrode current collector having the through-holes 20a and the negative electrode current collector having the through-holes 23a can remarkably be lowered.

The components of the aforesaid electric storage device will be explained in detail in the order described below: [A] positive electrode, [B] negative electrode, [C] negative electrode current collector and positive electrode current collector, [D] lithium electrode, [E] separator, [F] electrolyte solution, [G] outer casing.

[A] Positive Electrode

The positive electrode has the positive-electrode current collector and the positive electrode mixture layer coated on the positive electrode current collector. When the electric storage device functions as a lithium ion capacitor, a material that allows lithium ions and/or anions to be reversibly doped and de-doped can be employed as a positive electrode active material contained in the positive electrode mixture layer. Specifically, the positive electrode active material is not particularly limited, so long as it allows at least one of lithium ion or anion to be reversibly doped and de-doped. Examples of the positive-electrode active materials include activated carbon, transition metal oxide, conductive polymer, polyacene-based substance, etc.

For example, the activated carbon is made of an activated carbon grain that is subject to an alkali activation treatment and has a specific surface area of not less than 600 $m^2/g$. A phenolic resin, petroleum pitch, petroleum coke, coconut husk, coal-derived coke, etc. are used as the material of the activated carbon, wherein it is preferable to use the phenolic resin or coal-derived coke, since they can increase the specific surface area. Preferable alkali activators used for the alkali activation treatment of the activated carbons include salts or hydroxides of a metal lithium ion such as lithium, sodium, potassium, etc., wherein potassium hydroxide is more preferable. Examples of the methods of the alkali activation include the method in which a carbide and an activator are mixed, and then the resultant is heated in an airflow of inert gas, the method in which an activator is carried on a raw material of an activated carbon beforehand, the resultant is heated, and then a carbonizing process and activating process are performed, the method in which a carbide is activated with a gas activation by using water vapors, and then the resultant is surface-treated with an alkali activator. The activated carbon on which the alkali activation treatment is performed is pulverized by a known pulverizer such as a ball mill. A wide range of the grain size generally used can be applied. For example, it is preferable that $D_{50}$ is 2 μm or more, more preferably 2 to 50 μm, and most preferably 2 to 20 μm. Further, the activated carbon preferably having an average pore diameter of 10 nm or less and a specific surface area of 600 to 3000 $m^2/g$ is preferable. An activated carbon having a specific surface area of 800 $m^2/g$ or more, particularly 1300 to 2500 $m^2/g$ is more preferable.

When the electric storage device functions as a lithium ion battery, a conductive polymer such as polyanine or a material that allows lithium ions to be reversibly doped or de-doped can be employed as the positive electrode active material contained in the positive electrode mixture layer. For example, vanadium oxide ($V_2O_5$) or lithium cobalt oxide ($LiCoO_2$) can be used as the positive electrode active material. Examples of the other materials include a lithium-containing metal oxide represented by a chemical formula of $Li_xM_yO_z$ (x, y, z are positive numbers, M is a metal, or can be metals of two or more types), such as $Li_xCoO_2$, $Li_xNiO_2$, $Li_xMnO_2$, $Li_xFeO_2$, etc., or a transition metal oxide such as cobalt, manganese, vanadium, titanium, nickel, etc., or a sulfide. In case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt-nickel compound oxide.

The positive electrode active material described above is formed into a powdery shape, granular shape, short fibrous shape, etc., and this positive electrode active material is mixed with a binder to form an electrode slurry. The electrode slurry containing the positive electrode active material is coated on the positive electrode current collector and the resultant is dried, whereby the positive electrode mixture layer is formed on the positive electrode current collector. Usable binders mixed with the positive electrode active material include rubber binder such as SBR, fluorine-containing resin such as polytetrafluoroethylene, polyvinylidene fluoride, etc., thermoplastic resin such as polypropylene, polyethylene, polyacrylate, etc. A conductive material such as acetylene black, graphite, metal powder, etc. can appropriately be added to the positive electrode mixture layer.

[B] Negative Electrode

The negative electrode has the negative electrode current collector and the negative electrode mixture layer coated on the negative electrode current collector. The negative electrode mixture layer contains a negative electrode active material. The negative electrode active material is not particularly limited, so long as it allows ions to be reversibly doped and de-doped. Examples of the negative-electrode active material include graphite, various carbon materials, polyacene-based material, tin oxide, silicon oxide, etc. The graphite and hard carbon material (non-graphitizable carbon) are preferable as the negative-electrode active material, since they can increase the capacity. Further, a polyacene-based organic semiconductor (PAS) that is a heat-treated material of an aromatic condensation polymer is preferable for a negative-electrode active material, since it can increase the capacity. The PAS has a polyacene skeletal configuration. The ratio (H/C) of a number of hydrogen atoms to a number of carbon atoms is preferably within the range of not less than 0.05 and not more than 0.50. When the H/C of the PAS exceeds 0.50, the aromatic polycyclic configuration is not sufficiently grown, so that the lithium ions cannot smoothly be doped or de-doped. Therefore, the charging/discharging efficiency of the electric storage device 10 might be lowered. When the H/C of the PAS is less than 0.05, the capacity of the electric storage device might be lowered.

The aforesaid negative-electrode active material such as PAS is formed into a powdery shape, a granular shape or short fibrous shape. This negative electrode active material is mixed with a binder to form an electrode slurry. The electrode slurry containing the negative electrode active material is coated on the negative electrode current collector and the resultant is dried, whereby the negative electrode mixture layer is formed on the negative electrode current collector. Usable binders mixed with the negative electrode active material include fluorine-containing resin such as polytetrafluoroethylene, polyvinylidene fluoride, etc., thermoplastic resin such as polypropylene, polyethylene, polyacrylate, etc., and a rubber binder such as styrene butadiene rubber (SBR), etc. The fluorine-based binder is preferably used. Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene, etc. A conductive material such as acetylene black, graphite, metal powder, etc. can appropriately be added to the negative-electrode mixture layer.

[C] Positive Electrode Current Collector and Negative Electrode Current Collector Various materials generally proposed for a battery or a capacitor can be employed as the material of the negative electrode current collector and the positive electrode current collector. For example, aluminum, stainless steel or the like can be used as the material of the positive electrode current collector. Stainless steel, copper, nickel, etc. can be used as the material of the negative electrode current collector. The open-percentage of the through-holes formed on the positive electrode current collector and the negative electrode current collector is not particularly limited, but it is preferably set to 40 to 60%. The shape and number of the through-hole are not particularly limited, and they are appropriately set so long as they do not hinder the movement of the anions or lithium ions. The shape of the through-holes formed on the positive electrode current collector and the negative electrode current collector can have any shapes, such as circle, ellipse, rectangle, diamond, slit-like shape, or the like.

[D] Lithium Electrode

Various materials generally proposed as a current collector of a battery or a capacitor can be used as the material of the lithium-electrode current collector. Examples of these materials include a stainless steel, copper, nickel, or the like. The lithium-electrode current collector can have through-holes penetrating therethrough, such as an expanded metal, punching metal, etching foil, net, expanded member, etc. Instead of the metal lithium foil adhered onto the lithium electrode current collector, lithium-aluminum alloy, which can emit lithium ions, can be used.

[E] Separator

A porous member or the like having durability with respect to the electrolyte solution, positive-electrode active material, negative-electrode active material, or the like, having an open cell and having no electron conductivity can be used for the separator. Generally, a cloth, nonwoven fabric, or porous body made of paper (cellulose), glass fiber, polyethylene, polypropylene, etc. is used. The thickness of the separator can appropriately be set considering the holding amount of the electrolyte solution, strength of the separator, or the like. The thickness of the separator is preferably thin in order to lower the internal resistance of the electric storage device.

[F] Electrolyte Solution

It is preferable that an aprotic organic solvent containing a lithium salt is used for the electrolyte solution from the viewpoint that an electrolysis is not produced even by a high voltage and lithium ions can stably be present. Examples of the aprotic organic solvent include ethylene carbonate, propylene carbonate, dimethyl carbonate, diethyl carbonate, γ-butyloractone, acetonitrile, dimethoxyethane, tetrahydrofuran, dioxolane, methylene chloride, sulfolane, etc., wherein these material are used singly or mixed with one another. Examples of the lithium salt include $LiClO_4$, $LiAsF_6$, $LiBF_4$, $LiPF_6$, $LiN(C_2F_5SO_2)_2$, etc. Further, the concentration of the electrolyte in the electrolyte solution is preferably set to at least 0.1 mol/L or more, and more preferably set within the range of 0.5 to 1.5 mol/L, in order to lower the internal resistance due to the electrolyte solution.

Ionic liquid can be employed instead of the organic solvent. The combination of various cations and anions is proposed as the ionic liquid. Examples of the cations include N-methyl-N-propylpiperidinium (PP13), 1-ethyl-3-methyl-imidazolium (EMI), diethyl-methyl-2-methoxyethyl-ammonium (DEME), etc. Examples of the anions include bis(fluorosulfonyl)-imide (FSI), bis(trifluoromethanesulfonyl)-imide (TFSI), $PF_6^-$, $BF_4^-$, etc.

[G] Outer Casing

Various materials generally used for a battery can be used for the outer casing. A metal material such as iron or aluminum can be used, and a film material or the like made of resin can be used. The shape of the outer casing is not particularly limited. The outer casing can be formed into a shape appropriately selected according to the purpose, such as a cylindrical shape or rectangular shape. From the viewpoint of miniaturization or decreased weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used.

Embodiment 2

The embodiment 1 relates to a current-collector laminate unit in which plural current-collector materials are laminated.

As described in the embodiment 1, one aspect of the current-collector laminate unit is the configuration in which the current-collector materials are superimposed and laminated through film materials (blocking layers), for example. The current-collector laminate unit having the above-mentioned configuration can be conveyed faster than the case in which the perforated current-collector materials are conveyed without providing the film material therebetween. For example, the current-collector laminate unit can be conveyed faster in the horizontal direction. Specifically, since the current-collector materials are laminated on both surfaces of the film material with a certain adhesive force, the strength is reinforced by the film material during the transportation of the laminated perforated current-collector materials.

In the configuration in which the perforated current-collector materials are laminated on both surfaces of the film material, force such as tensile force is exerted on both surfaces of the film material. The force such as the tensile force is strongly exerted on the portion that is in contact with the hole portions of the current-collector materials, which are laminated on both surfaces of the film material. When the force exerted on both surfaces of the film material is excessively larger than the strength of the film material, the film material is broken. Therefore, it is preferable that the force exerted on the film material is distributed as much as possible rather than is concentrated on a specific area.

Specifically, the holes formed on the laminated current-collector materials are preferably formed such that the holes on one current-collector material formed on one surface of the film material are shifted from the holes on the other current-collector material formed on the other surface of the film material. In other words, the through-holes formed on the current-collector materials 31 and 32 provided through the film material 33 are preferably shifted from each other as shown in FIG. 5D in the embodiment 1.

Figure 15A:
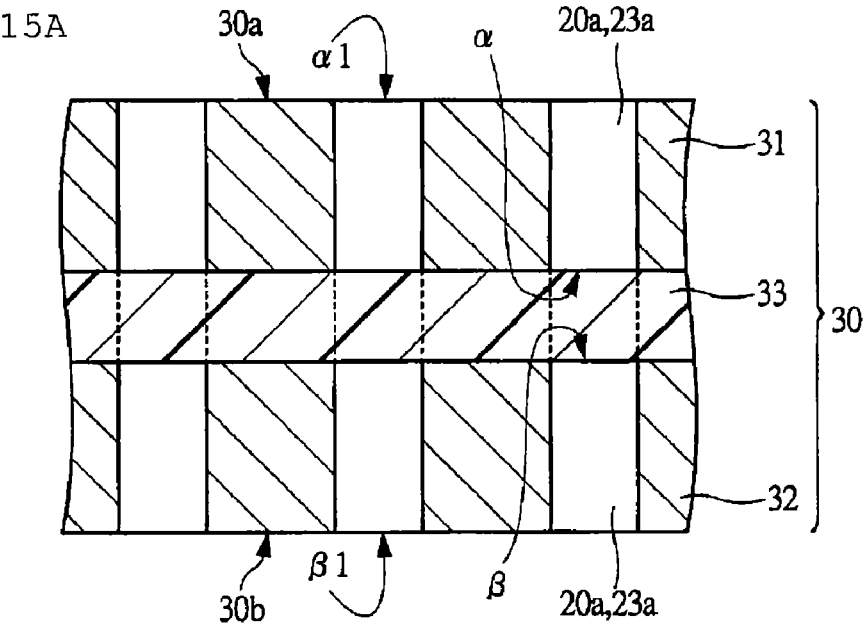

FIG. 15A illustrates the case in which the through-holes 20a and 23a formed on the respective current-collector materials 31 and 32 provided on both sides of the film material 33 serving as the blocking layer are matched. Specifically, the position of the open surface α, which faces the film material 33, of the through-holes 20a and 23a formed on the current collector material 31 and the position of the open surface β, which faces the film material 33, of the through-holes 20a and 23a formed on the current-collector material 32 agree with each other. The state in which the positions of the open surfaces α and β agree with each other is illustrated by linking the through-holes formed on the current-collector materials 31 and 32 provided at both sides of the film material 33 with a broken line.

Figure 15B:
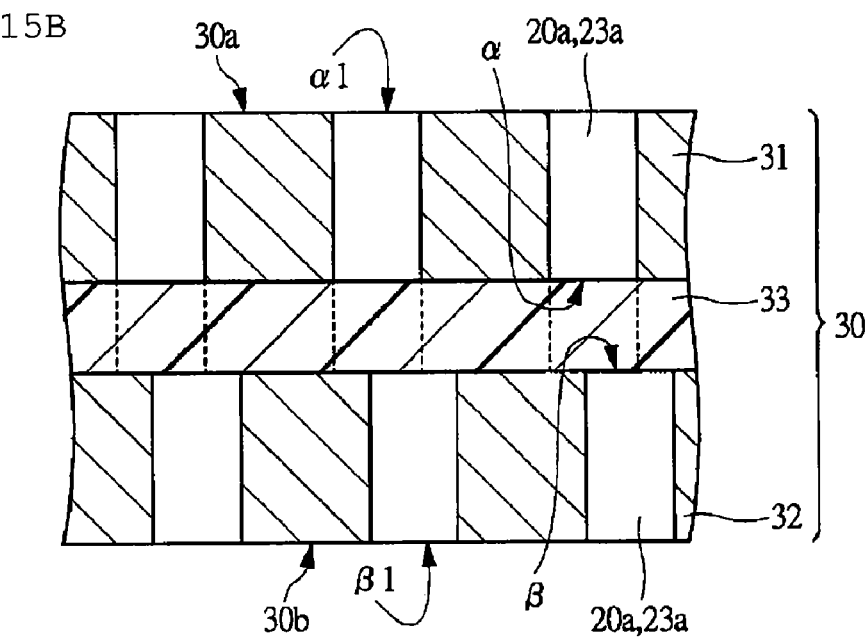
FIG. 15B is an explanatory view illustrating the case in which the opposing open surfaces are shifted from each other.

On the other hand, FIG. 15B illustrates the case in which the through-holes 20a and 23a formed on the respective current-collector materials 31 and 32 provided on both sides of the film material 33 serving as the blocking layer are shifted from each other. Specifically, the position of the open surface α, which faces the film material 33, of the through-holes 20a and 23a formed on the current collector material 31 and the position of the open surface β, which faces the film material 33, of the through-holes 20a and 23a formed on the current-collector material 32 are shifted from each other.

It would be more preferable for the film material 33 in terms of the strength that the open surfaces α and β, facing the film material 33, of the through-holes 20a and 23a formed on the respective current-collector materials 31 and 32 are shifted from each other as described above. As schematically illustrated in FIG. 5C in the embodiment 1, the through-holes 20a and 23a are formed in accordance with the position of the holes in a predetermined pattern on the resist layer 34 with an etching or other process. The resist layer 34 is formed by pattern forming process, which includes a step of exposure or development, with the use of a mask having a perforated arrangement pattern formed thereon.

Each of the through-holes 20a and 23a can have various planar shapes such as a circle, polygon, or indeterminate shape. Specifically, various shapes described above can be applied to the planar shape of the open surface, which faces the film material, of the through-holes formed on the current-collector materials. Although described later, a shape having a corner is sometimes preferable rather than a complete circle. For example, from the viewpoint of preventing the electrode material, which is filled in the through-holes 20a and 23a, from dropping off, the shape having a corner is sometimes preferable.

Figure 16A:
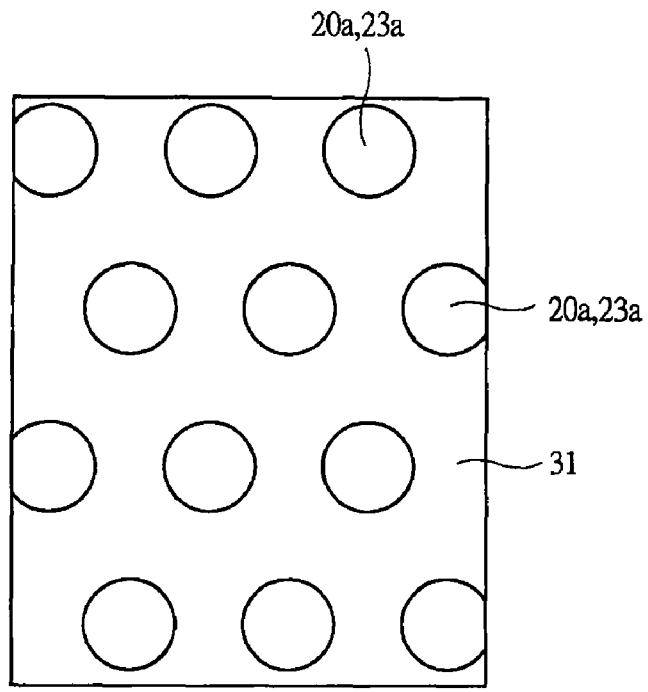

When the open surface of the through-holes 20a and 23a facing the film material has a completely circular planar shape, for example, a hole pattern illustrated in FIG. 16A can be taken as an example. In the hole pattern, the through-holes 20a and 23a, each having an open surface of the same shape, are arranged orderly in the longitudinal direction and lateral direction with a fixed pitch in a zigzag form. FIG. 16A illustrates the state of the plane when a part of the current-collector material 31, which is formed into a band-like and long-sized form with a predetermined width, is cut.

For example, the through-holes 20a and 23a are formed on the current-collector material 31 with the hole pattern illustrated in FIG. 16A. On the other hand, the through-holes 20a and 23a are formed on the current-collector material 32 with the same hole pattern, although not shown. In the present embodiment, the case in which, when the through-holes are formed on the current-collector materials 31 and 32 provided on both surfaces of the film material 33, the hole pattern having the same arrangement of the open surface of the hole is used will be described. However, a different hole pattern can be used for the hole pattern used for the current-collector materials 31 and 32.

The state in which the hole pattern same as the pattern of the through-holes formed on the current-collector materials can be defined that the shape of the open surface, the area of the open surface, and the open-area percentage are the same. It is to be noted that the open-area percentage can be defined as the ratio of the area of the open surface on the current collector. Specifically, the open-area percentage is the ratio of the total area of the open surface on the current collector to the area of the metal portion of the current collector, to be strict. The current collector is manufactured by cutting the current-collector material into pieces. When the manufactured current collector is tested, the open-area percentage can be measured. The open-area percentage can briefly be calculated in terms of the ratio of the total area of the open surface per unit area set to the current-collector material. The open-area percentage can also be calculated briefly in terms of the ratio of the decreased weight of the current-collector material to the weight of the current-collector material without through-holes.

Figure 16B:
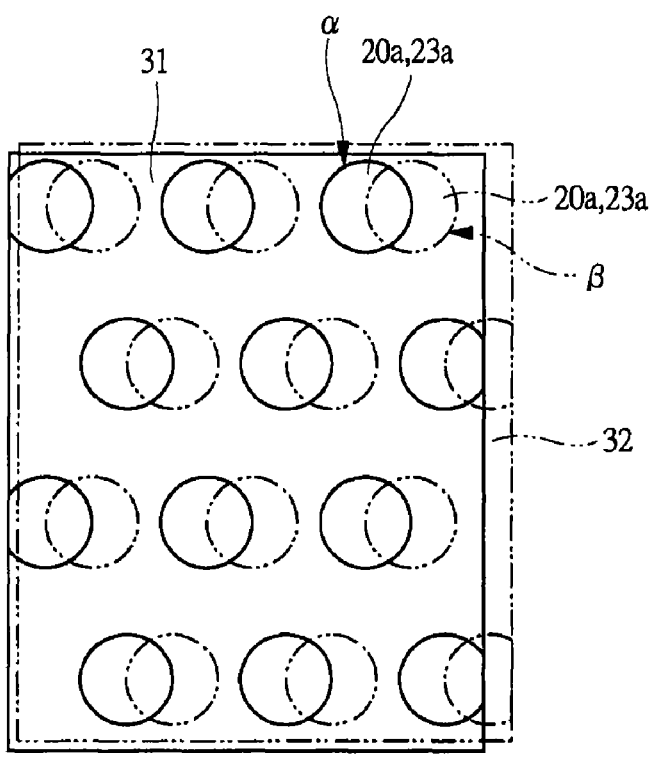
FIG. 16B illustrates the case in which the opposing open surfaces are shifted from each other.

FIG. 16B schematically illustrates the state in which the current-collector material 32 provided so as to be opposite to the current collector material 31 through the film material 33 is seen from the current-collector material 31 side. The circle indicated by a solid line is the open surface α of the through-holes 20a and 23a formed on the current-collector material 31. The circle indicated by a two-dot-chain line indicates the open surface β of the through-holes 20a and 23a formed on the current-collector material 32. The film material 33 sandwiched between the current-collector materials 31 and 32 is omitted for better understanding. The film material 33 is similarly omitted in the drawings for explaining the superimposed condition of the through-holes below.

In FIG. 16B, the position of the open surface α of the through-holes 20a and 23a formed on the current-collector material 31 is shifted from the position of the open surface β of the through-holes 20a and 23a formed on the current-collector material 32. In order to shift the positions of the open surfaces α and β of the through-holes 20a and 23a formed on the current-collector materials 31 and 32 from each other, the through-holes can be formed by shifting the positions of the hole patterns on the resist layers provided on the current-collector materials 31 and 32.

Figure 17:
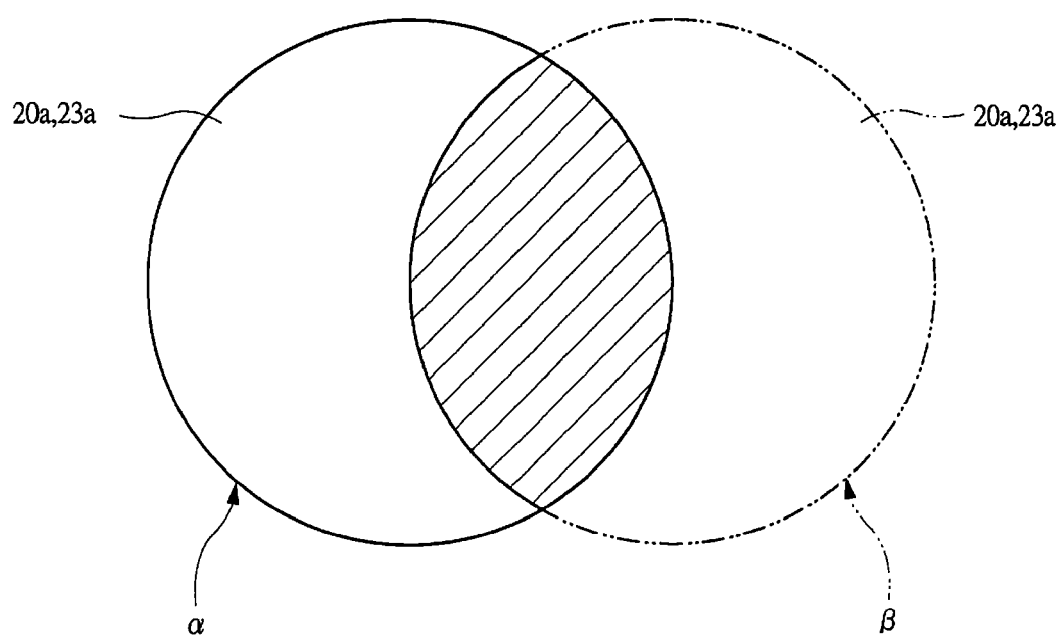
FIG. 17 is an explanatory view showing an overlapping rate of the open surface.

If the opposing open surfaces α and β of the through-holes are shifted from each other even slightly as illustrated in FIG. 16B, it is considered strictly that the strength is basically enhanced as compared with the case that they agree with each other. However, it is when the ratio of the area of the overlapped portion (the hatched portion in the figure) of the open surfaces α and β is not more than a predetermined value of the area of the open surface α (or the open surface β) as illustrated in FIG. 17 that the effect of enhancing the strength is clearly and substantially realized. Specifically, the ratio of the overlapped portion of the open surfaces α and β (hereinafter sometimes referred to as an overlapping rate) is preferably 50% or less. Needless to say, the overlapping rate can be 0%. The basis of "50% or less" is the balance between the open-area percentages of the current-collector materials 31 and 32. As the overlapping rate becomes lower, the open-area percentages of the current-collector materials 31 and 32 become lower.

More preferably, the overlapping rate has to be 10% or more and 30% or less. When the overlapping rate is less than 10%, it is considered that the open-area percentage of the current-collector materials 31 and 32 is unfavorable. When the overlapping rate exceeds 30%, it is considered that the strength of a support member for the opening portion is unfavorable. Within the range of not less than 10% and not more than 30%, there is no adverse effect caused by the lowering in the strength of the film material as described previously according to the experiment conducted so far.

The overlapping rate (%) is defined on the assumption that the open surfaces α and β have the same area in the above-mentioned description. However, if the open surfaces α and β have the different areas, the overlapping rate can be defined with the ratio to the open surface having the larger area.

When the through-holes are formed on the current-collector material, it is supposed that a resist layer, on which a pattern of a hole arrangement is formed, is provided on the surface of the current-collector material with a printing method or the like, and then the resist layer is wound up again in a roll. In the current-collector laminate unit wound into a roll, tensile forces, each having a different magnitude, are exerted respectively on the inner side and the outer side of the roll, so that the resist layer might be shifted. In view of this, the overlapping rate is preferably set within a certain specific range, rather than is set to a certain specific value.

When the overlapping rate is set within the specific range, the hole patterns on the resist layers provided on the current-collector materials 31 and 32 are easy to be shifted, even when the resist layers are formed on the surfaces of the respective current-collector materials. When the shifted position is set to be a specific value, a user has trouble performing a positioning process as same as making the positions of the open surfaces completely agree with each other. To decrease the number of processes needed for the positioning is significantly important in a mass production. This is because decrease in the number of processes needed for the positioning leads to the enhancement in production efficiency. Naturally, the production cost can be lowered correspondingly.

Figure 18:
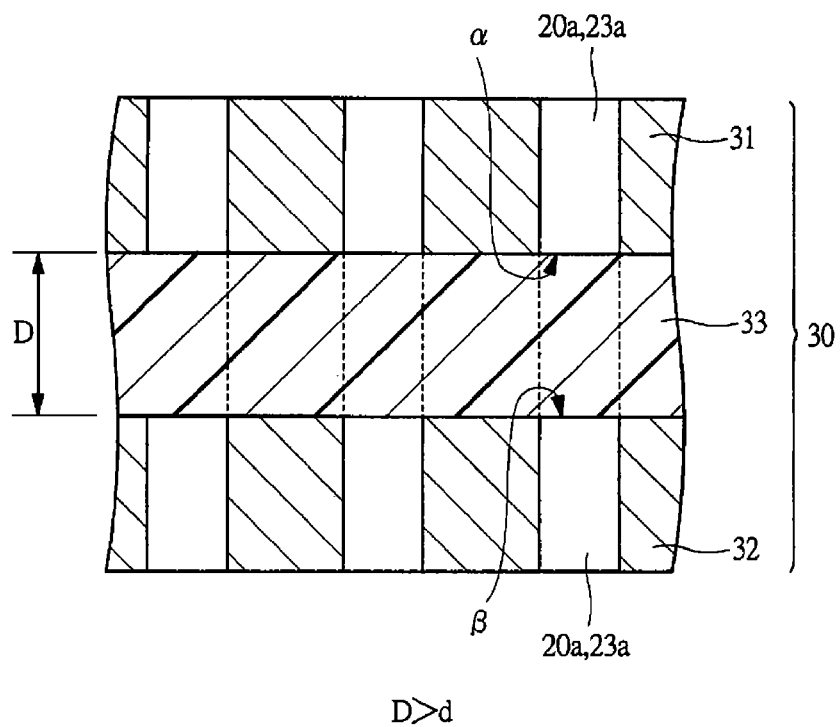
FIG. 18 is an explanatory view showing the case in which the opposing open surfaces agree with each other.

Since the positions of the opposing holes of the open surfaces of the through-holes formed on the current-collector materials provided on both surfaces of the film material are shifted as described above, the thickness of the current-collector laminate unit can be decreased. In the configuration in which the positions of the opposing holes agree with each other, the thickness D of the film material is considered to be large in order to secure the strength as illustrated in FIG. 18, in case where the film material of the same composition is used, for example. In the case illustrated in FIG. 18, the thickness D of the film material 33 is about twice the thickness d shown in FIG. 15B. On the other hand, if the hole positions are shifted, the thickness d of the film material 33 can be decreased as shown in FIG. 15B, for example.

The overlapping rate of the through-holes 20*a* and 32*a* is affected by the number of the holes on the current-collector materials 31 and 32. The degree of the number of the holes is known by the open-area percentage. When the hole is formed with the pitch same as that of the adjacent hole, the overlapping rate of 0% is impossible, in case where the same hole patterns whose open-area percentage exceeds 50% are used for the current-collector materials 31 and 32. Specifically, it is impossible to consider the configuration in which the open surfaces α and β are not at all overlapped.

Incidentally, the overlapping rate of 0% means that the open surface α and the open surface β are not at all overlapped. On the other hand, the overlapping rate of 100% means that the open surface α and the open surface β completely agree with each other.

The overlapping rate can be confirmed by the method in which light, which passes through the film that is sandwiched between the current-collector materials in the current-collector laminate unit, is irradiated from one current-collector material side to the other current-collector material side. Light having different transmittance between the current-collector material and the film material can be irradiated. For example, light that has a property of not passing through the current-collector material but passing through the film material can be employed. The overlapping rate can be determined from the transmittance such as the transmittance amount, transmittance area, or the like.

When the holes formed on the current-collector material are regularly arranged, the overlapping rate can easily be verified with the transmittance per unit area. For example, in the hole pattern in which the planar shape of the open surface of each of the formed through-holes is constant, and the holes are regularly arranged with a pitch, that has a fixed regularity, between the adjacent holes, the overlapping rate of the holes can be calculated from the transmittance per unit area that is appropriately set.

Figure 19A:
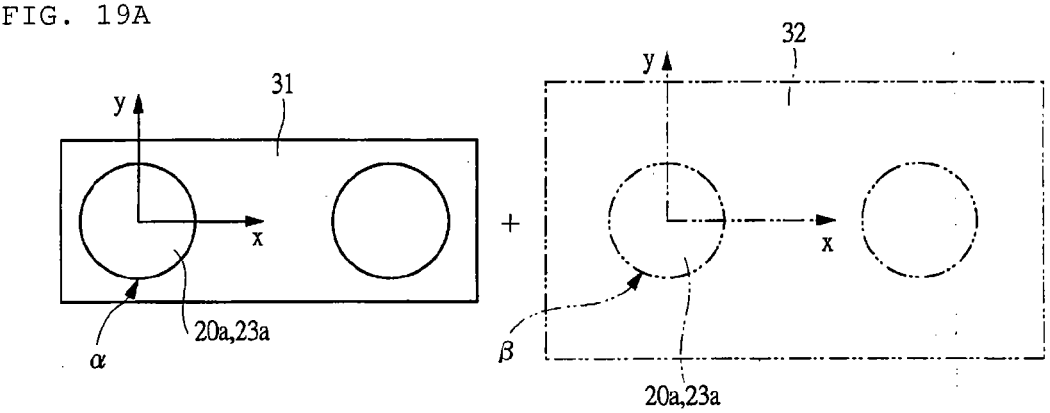
FIGS. 19A to 19C are explanatory views illustrating the manner of shifting the positions of the opposing open surfaces.
Figure 19B:
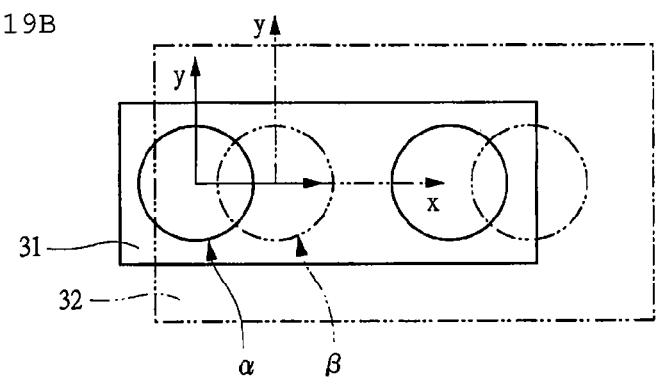
Figure 19C:
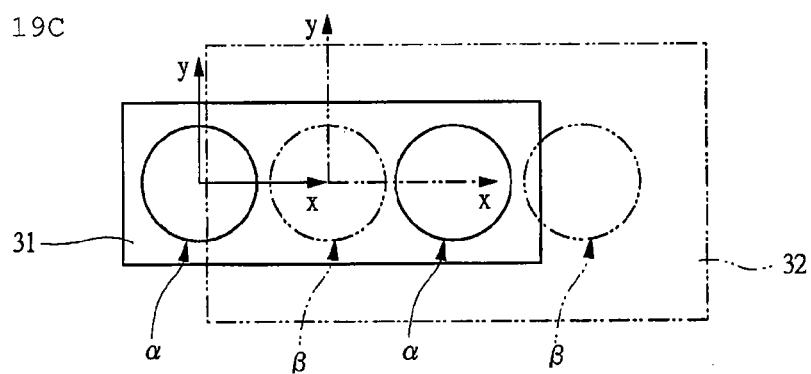

Various manners are considered to shift the open surfaces of the holes in the above-mentioned configuration. For example, it is supposed that two holes whose open surfaces α and β are circular are formed on the current-collector materials 31 and 32. As illustrated in FIG. 19A, the supposed direction of shifting the positions of the open surfaces α and γ is basically the mutually orthogonal x-axis and y-axis directions, for example. FIG. 19B illustrates that the open surfaces α and β are shifted in the x-axis direction. In FIG. 19B, the open surfaces α and β are shifted as partly overlapped with each other. FIG. 19C illustrates that the open surfaces α and β are shifted in the x-axis direction in order not to be overlapped with each other, i.e., in order to establish the overlapping rate of 0%.

Figure 20A:
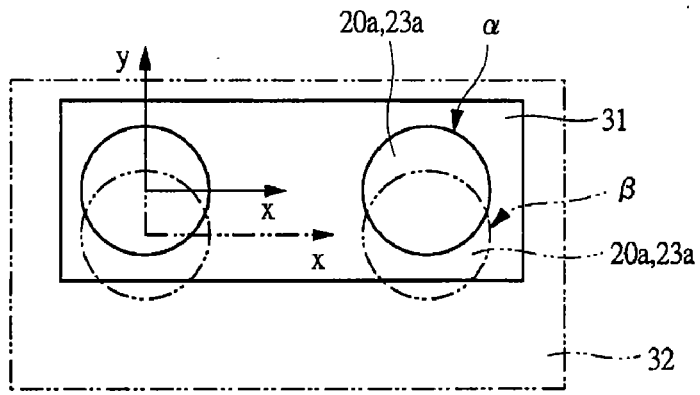
FIGS. 20A to 20C are explanatory views illustrating the manner of shifting the positions of the opposing open surfaces.
Figure 20B:
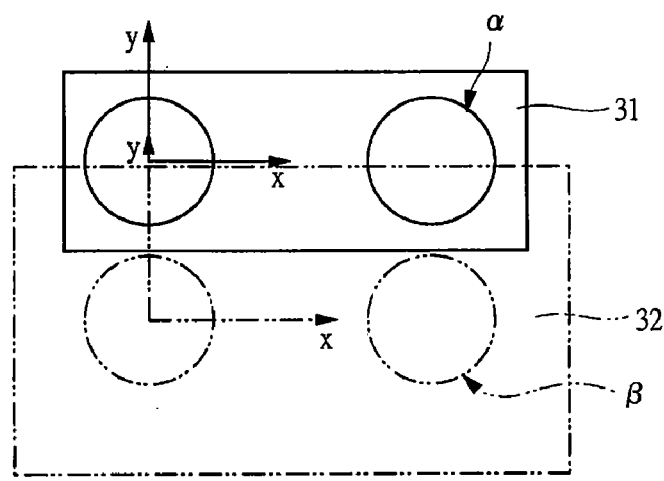
Figure 20C:
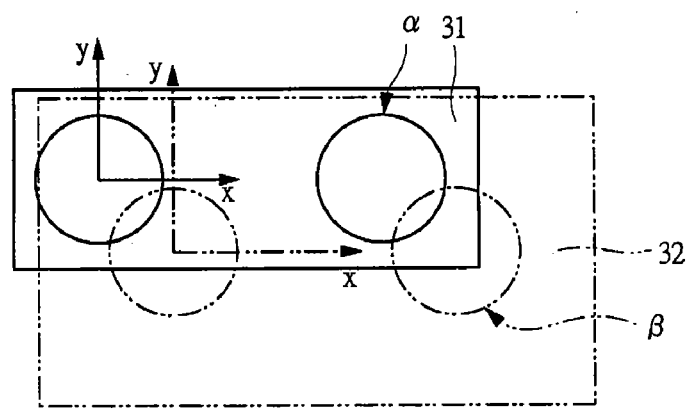

It can be supposed that the open surfaces α and β are shifted in the y-axis direction as partly overlapped with each other as illustrated in FIG. 20A. FIG. 20B illustrates that the open surfaces α and β are shifted in the y-axis direction with the overlapping rate of 0%. As illustrated in FIG. 20C, the open surfaces α and β can be shifted in both of x-axis direction and y-axis direction. Although not shown, when the pitch of the adjacent open surface α is smaller than the diameter of the open surface α, it is considered that the open surface β is overlapped with both of the adjacent open surfaces α, even if the open surfaces α and β are shifted in the x-axis direction or y-axis direction.

Figure 21A:
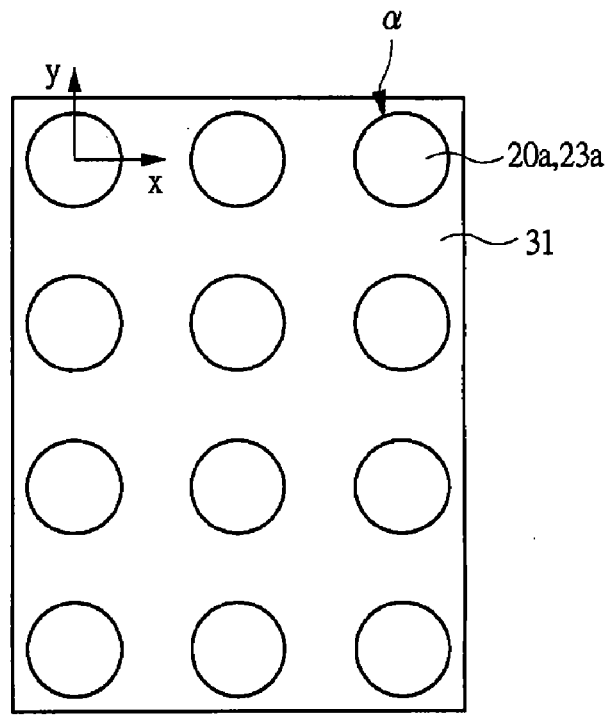
FIGS. 21A and 21B are explanatory views illustrating the manner of shifting the positions of the opposing open surfaces.

FIG. 21A illustrates that the arrangement pattern of the open surfaces α of the through-holes 20*a* and 23*a* formed on the current-collector material 31 is different from that in FIG. 16A. In this hole pattern, the circular open surfaces α are aligned in the longitudinal direction and lateral direction with the same pitch. FIG. 21A illustrates the state in which the perforated long-sized current-collector material 31 is partly cut. Although not shown, the through-holes 20*a* and 23*a* are similarly formed on the current-collector material 32 with the same hole pattern.

Figure 21B:
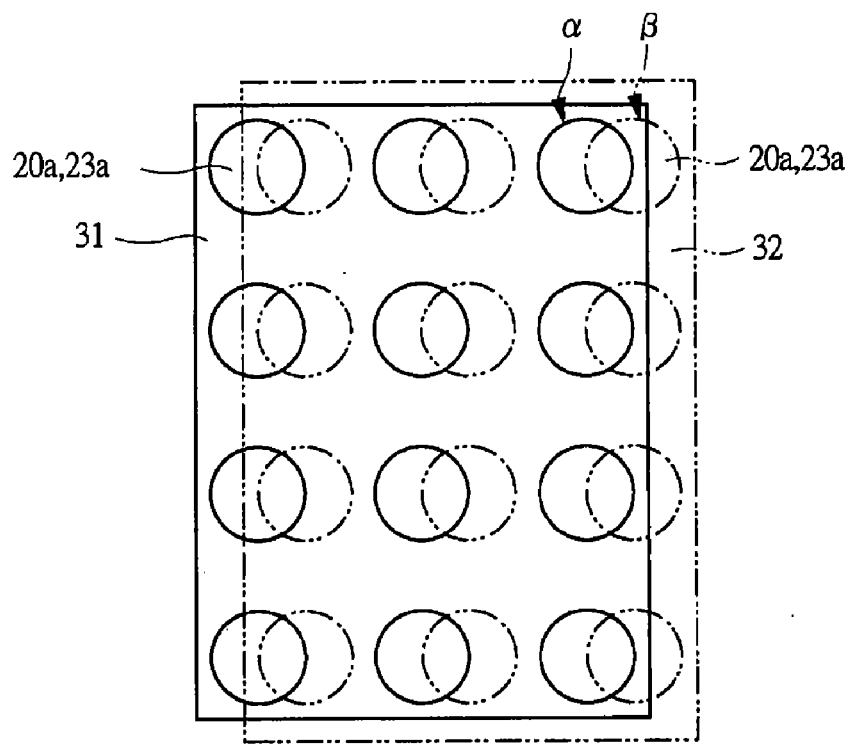

FIG. 21B illustrates that both of the current-collector materials 31 and 32 having the through-holes formed thereon are arranged so as to be opposite to each other through the film material 33. FIG. 21B is a view in which the current-collector material 32 is seen from the current-collector material 31. Like FIG. 16B, a solid line indicates the open surfaces α, the broken line indicates the open surfaces β, and the film material 33 sandwiched between the current-collector materials 31 and 32 is omitted.

Figure 22A:
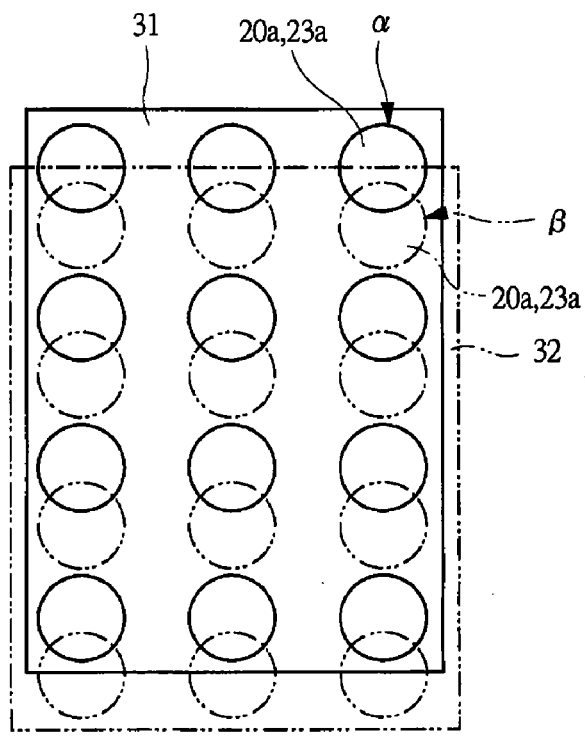
FIGS. 22A and 22B are explanatory views illustrating the manner of shifting the positions of the opposing open surfaces.
Figure 22B:
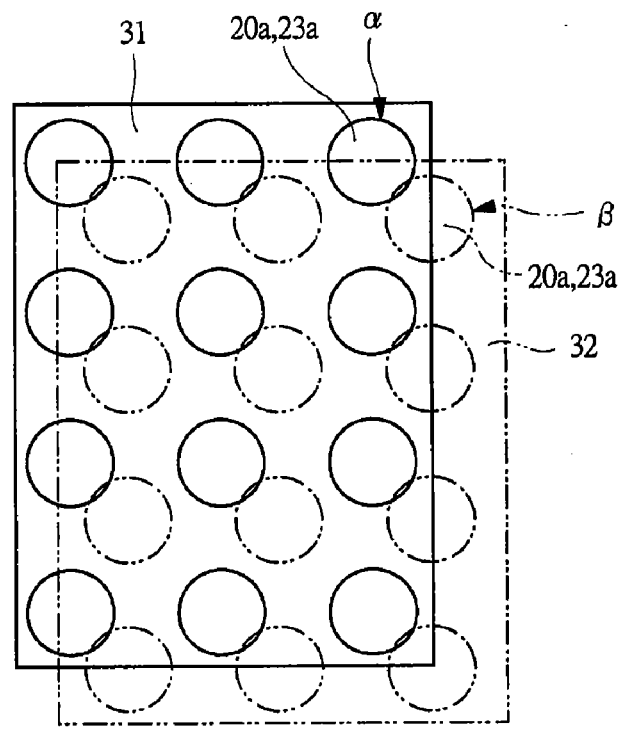
Figure 23:
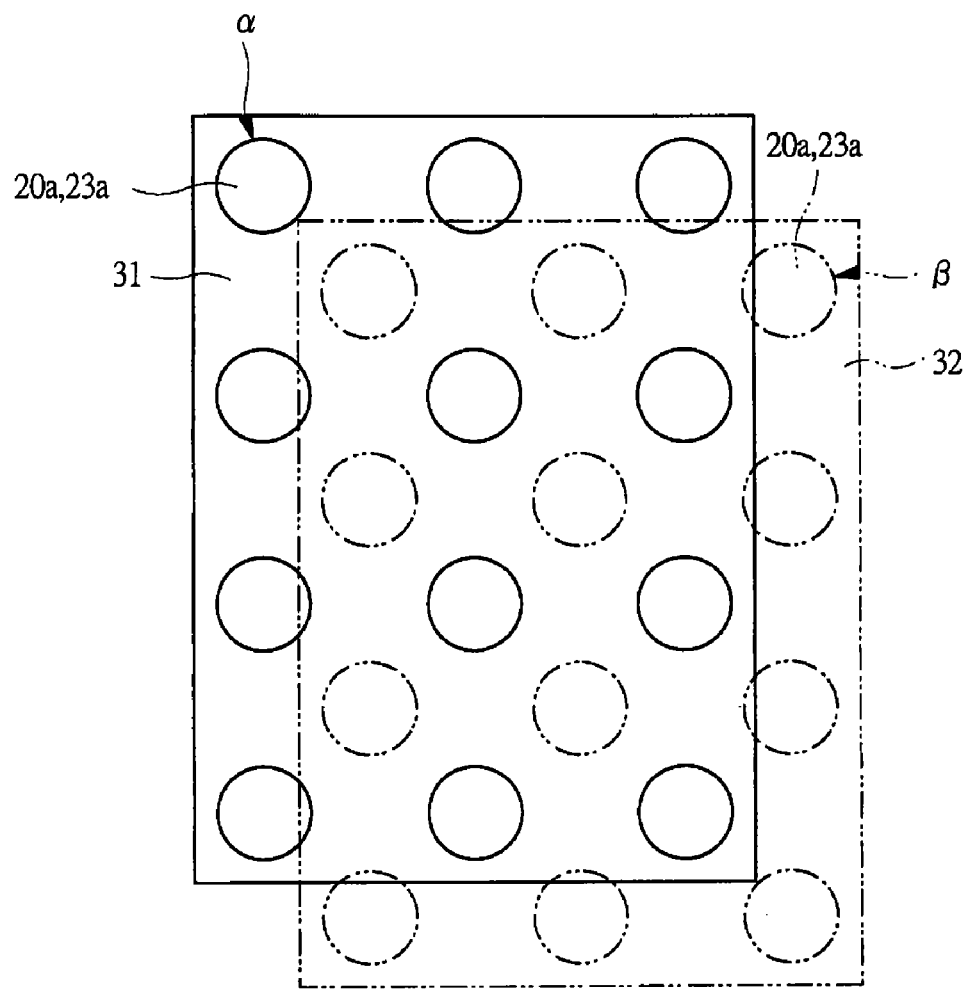
FIG. 23 is an explanatory view illustrating the manner of shifting the positions of the opposing open surfaces.

As illustrated in FIG. 21B, the positions of the open surfaces α of the through-holes 20a and 23a formed on the current-collector material 31 are shifted from the positions of the open surfaces β of the through-holes 20a and 23a formed on the current-collector material 32 in the x-axis direction. Therefore, the forces such as the tensile forces are distributed without concentrating on a certain portion on the both surfaces of the film material 33 sandwiched between the current-collector materials 31 and 32 as described previously. Compared to the case in which the positions of the open surfaces of the opposing holes agree with each other, the strength of the current-collector laminate unit is surely secured. FIG. 22A illustrates that the open surfaces α and β are shifted in the y-axis direction. FIG. 22B illustrates that the open surfaces α and β are shifted in the x-axis direction and y-axis direction. FIG. 23 illustrates that the overlapping rate is 0%.

In the above description, the through-holes 20a and 23a have vertical straight sections as in the embodiment 1. Specifically, as illustrated in FIGS. 15A and 15B, the open surfaces α and β are formed on the surfaces of the current-collector materials 31 and 32 that are in contact with the film material 33. The open surfaces α1 and β1 are formed on the front surfaces 30a and 30b of the current-collector materials 31 and 32. The open surfaces α and β and the open surfaces α1 and β1 have the same size. When the through-holes 20a and 23a are formed, the current-collector material is subject to the perforating process, such as an etching, in order that the penetration direction of the through-hole is anisotropic to make the sections of the through-holes vertically straight.

On the other hand, when the perforating process such as an etching is performed to form the through-holes 20a and 23a without becoming conscious of the anisotropy, the through-holes 20a and 23a have a tapered shape. Specifically, the open surfaces α1 and β1 on the front surfaces 30a and 30b of the current-collector materials 31 and 32 are larger than the open surfaces α and β on the surfaces in contact with the film material 33.

Figure 24A:
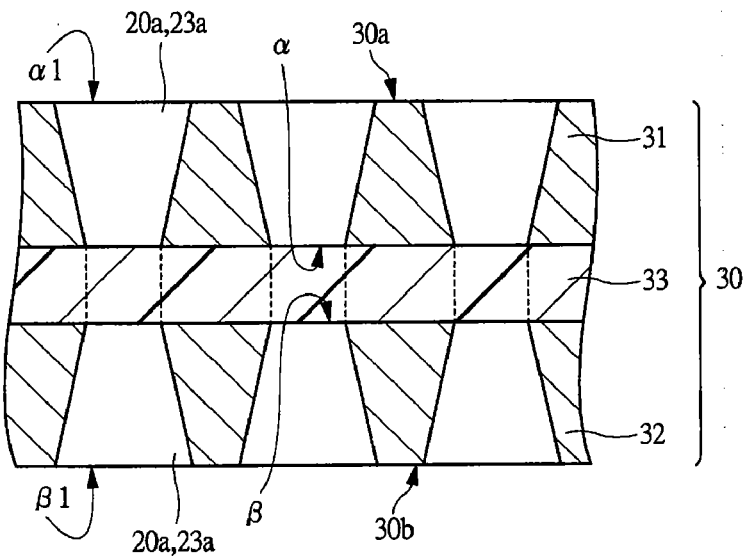
Figure 24B:
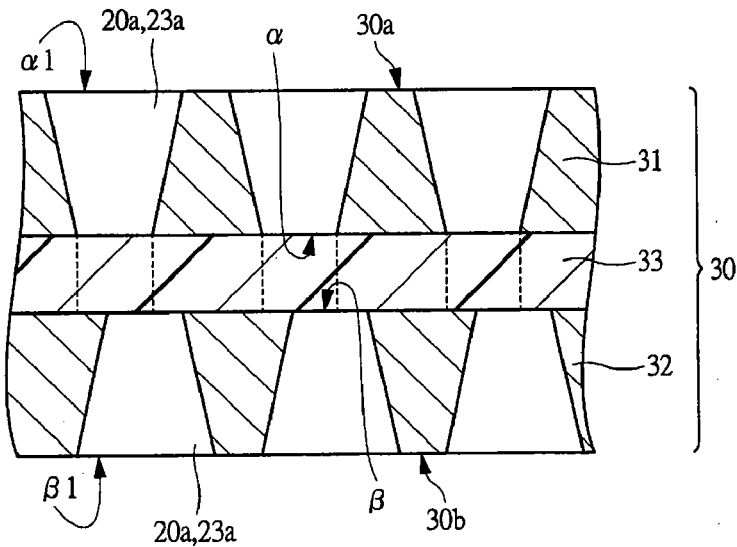
FIG. 24B is an explanatory view illustrating the modification of the case in which the opposing open surfaces are shifted from each other.

FIG. 24A illustrates that the positions of the open surfaces α and β of the through-holes 20a and 23a formed on the current-collector materials 31 and 32, which are opposite to each other through the film material 33, agree with each other. FIG. 24B illustrates that the positions of the open surfaces α and β of the through-holes 20a and 23a formed on the current-collector materials 31 and 32, which are opposite to each other via the film material 33, are shifted from each other. Even when the through-holes 20a and 23a have the non-vertical shape, the open surfaces α and β on the surface facing the film material 33 are preferably shifted from each other as in FIGS. 16B, 21B, 22, and 23.

Since the open surfaces α and β are shifted from each other as described above, the strength of the current-collector laminate unit 30 is entirely reinforced, compared to the case in which the open surfaces α and β agree with each other. As a result, the current-collector materials can be conveyed faster in the horizontal direction than in the case in which the open surfaces α and β agree with each other. Further, the thickness of the film material 33 interposed between the current-collector materials as a blocking layer can be decreased.

In order to shift the positions of the open surfaces of the through-holes formed on the plural current-collector materials laminated through the film material (blocking layer), the hole patterns on the resist layers, which are provided on the surfaces of the respective current-collector materials for etching, are shifted from each other. If so, the positions of the open surfaces of the opposing through-holes formed in accordance with the patterns on the resist layers are formed to be shifted from each other, including the case in which the overlapping rate is 0%.

Specifically, since the resist patterns provided on the current-collector materials 31 and 32 are consciously shifted from each other, the open surfaces α and β of the holes formed by the etching process are shifted from each other. The degree of the shift may be set such that the overlapping rate of the open surfaces α and β is 50% or less including 0%. Preferably, it may be set such that the overlapping rate is 10% or more and 30% or less.

It is preferable from the viewpoint of the strength that the positions of the open surfaces of the through-holes formed on the current-collector materials, which are provided so as to sandwich the blocking layer, such as a film, are shifted from each other. Specifically, as in the explanatory view of the etching process in FIG. 5C in the embodiment 1, the positions of the holes on the current-collector materials 31 and 32 at both sides of the film material 33 are preferably shifted from each other.

The positions of the through-holes on the current-collector materials opposite to each other through the film material are determined by the perforating pattern on the resist layer, when the etching process is employed. The open surface of each of the holes formed as described above is extremely small. Therefore, it is difficult to make the open surfaces agree with each other, so that it is time-consuming process, and further the production cost is increased.

This problem is solved by the very simple process of shifting the positions of the opposing open surfaces within a certain specific range, and at the same time, the strength of the current-collector laminate unit is enhanced. The effort for the strict positioning is saved, and a rough positioning is possible. Therefore, the production cost for the current-collector materials and the current collectors can be decreased. Moreover, the production cost for the electrode employing the current-collector can be decreased, and the production cost for an electric storage device such as a battery, capacitor, or the like, employing the electrode can be decreased.

As for the strength of the current-collector laminate unit, when the positions of the open surfaces of the opposing holes agree with each other, the film material, which is sandwiched between the open surfaces α and β, may be easy to be broken at the time of cleaning with etching solution. The film material may be easy to be broken in the peeling process of the resist layers, application process of the electrode material, peeling process of the film material, serving as the blocking layer, for one side each, or peeling process of the film material for both surfaces. Although the film material is not broken, problems may occur such as the generation of wrinkles.

However, the breakage of the film material or the generation of wrinkles can be prevented from occurring by employing the configuration in which the positions of the open surfaces of the opposing holes are shifted from each other. Therefore, the strength of the current-collector laminate unit can entirely be enhanced. As a result, the speed of the horizontal conveyance in the processes after the etching process can be set faster than the speed in the case in which the positions are not shifted from each other.

In the above-mentioned description, the hole patterns of the open surfaces of the through-holes formed on the current-collector materials, which are provided via the film material, are the same. However, the hole patterns for the respective current-collector materials laminated on the film material can be different from each other. The same hole patterns are used, when electrodes are produced on the assumption that they are used in the same electric storage device. However, a current-collector laminate unit can be formed by laminating different current-collector materials in order to produce a current-collector having a different open-area percentage.

If the open-area percentage of the hole pattern is different, a current-collector material having an open-area percentage of less than 50% can be used for the other, when one of the current-collector materials has an open-area percentage exceeding 50%. In this case, the overlapping rate can be preferably set to 0, or close to 0.

The configuration described above can be described as follows as a technical scope. Specifically, as a technical scope 1, it is a manufacturing method of a current collector in which a current-collector material is cut into individual pieces, wherein open surfaces of through-holes, which are formed on the current-collector materials provided so as to be opposite to each other, are shifted from each other. As a technical scope 2, in the manufacturing method of a current collector according to the technical scope 1, shifting the open surfaces of the through-holes means that the opposing open surfaces are shifted so as not to be overlapped. As a technical scope 3, in the manufacturing method of a current collector according to the technical scope 1, shifting the open surfaces of the through-holes means that the opposing open surfaces are shifted so as to be partly overlapped. As a technical scope 4, in the manufacturing method of a current collector according to the technical scope 3, shifting the open surfaces of the through-holes so as to be partly overlapped means that the open surfaces are shifted as overlapped with each other with an overlapping rate within the range of 10% or more and 30% or less. As a technical scope 5, in the manufacturing method of a current collector according to any one of the technical scopes 1 to 4, the through-holes having the open surfaces of the same shape and having the same arrangement of the open surfaces are formed on the current-collector materials, which are provided so as to be opposite to each other, in such a manner that the positions of the open surfaces are shifted from each other. As a technical scope 6, in the manufacturing method of a current collector according to any one of the technical scopes 1 to 4, the current-collector materials that are provided so as to be opposite to each other have the through-holes formed thereon having a different open-area percentage. As a technical scope 7, in the manufacturing method of a current collector according to any one of the technical scopes 1 to 6, providing the current-collector materials so as to be opposite to each other means that they are provided with a blocking layer, such as a film material or the like, interposed therebetween. As a technical scope 8, it is an electrode including a current collector having through-holes formed thereon, wherein the current collector is produced by the manufacturing method of a current collector described in any one of the technical scopes 1 to 7. As a technical scope 9, it is an electric storage device including an electrode provided with a current collector, wherein the current collector is produced by the manufacturing method of a current collector described in any one of the technical scopes 1 to 7.

Embodiment 3

In the current-collector laminate unit described in the embodiments 1 and 2, the through-holes are formed on the plural current-collector materials laminated via the blocking layer. The electrode slurry is applied on the through-holes, and then the resultant is dried to form the electrode mixture layer as described in the embodiment 1. In the formation of the electrode mixture layer, the electrode mixture layer is filled in the through-holes in some cases. FIGS. 6, 10 and 11 in the embodiment 1 illustrate the configuration in which the electrode slurry is not filled in the through-holes. However, the electrode slurry can be filled as illustrated in FIGS. 25A-D, 26A-C, and 27A-C. The electrode mixture layer formed by drying the filled electrode slurry is held by the film material, serving as the blocking layer, so as to prevent the electrode mixture layer from slipping off. However, after the electrode mixture layer is formed, the film material serving as the blocking layer is peeled as described in the embodiment 1.

Specifically, the film material is separated from the current-collector materials laminated on the film material. The filled electrode mixture layer might be dropped at the time of peeling the film material. In general, the drop of the electrode mixture layer occurs in some through-holes. In the current collectors formed by cutting the current-collector material thus configured into individual pieces, the ion conduction ability of the through-holes may not be uniform. Or the ion conduction ability of the through-holes may be different in various portions of the current collector.

Therefore, when the electrode laminate unit is assembled by using the current collector described above, a significant difference occurs in the conductivity of ion, such as lithium ion, passing through the through-holes. Accordingly, the uniformity in the ion dope in a predetermined time might be deteriorated, for example. In other cases, the variation in the doping amount of ions in a predetermined time might be increased.

In view of this, the present inventors have considered the drop-prevention measure of the electrode mixture layer filled in the through-holes, when the film material serving as the blocking layer is peeled, in the present embodiment. Various measures can be considered as the drop-prevention measure. For example, it is considered that the shape of each hole is changed to a suitable shape with which the electrode mixture layer is difficult to drop. The shape of the cross-section along the penetration direction of the through-hole can be changed. Alternatively, the planar shape of open surface of the hole facing the film material can be changed.

So far, attention has been paid to form the through-holes whose cross-section becomes as vertically straight as possible with a wet etching, for example. Specifically, various measures have been taken, such as the composition of the etching solution, mask for forming patterns on the resist layers, or the like. Consequently, the production cost is increased in the process of forming the through-holes on the current-collector material.

In the configuration of the current-collector laminate unit, the blocking layer is peeled after the electrode mixture layer is filled in the through-holes, as is described in the embodiment 1. For example, the blocking layer such as the film material is peeled as shown in the step S107 in FIG. 4 or in FIG. 6C in the embodiment 1. In the peeling step, the unfavorable situation, such as the drop of the electrode mixture layer filled in the through-holes, may occur.

Figure 28A:
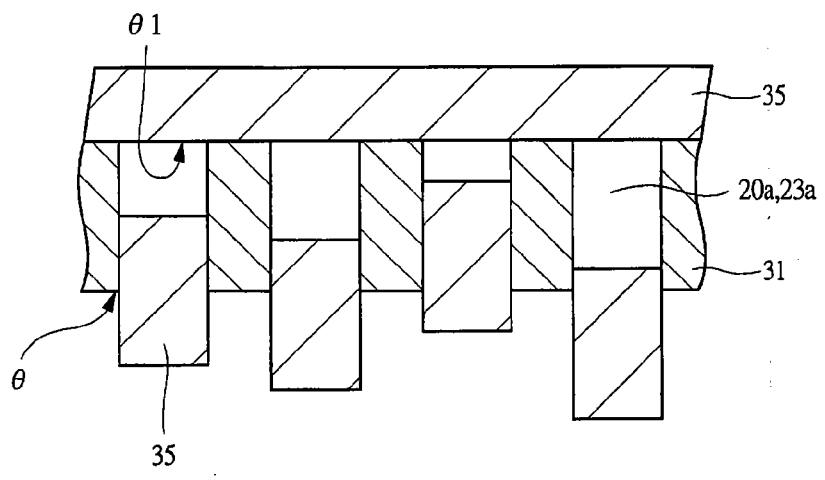
FIGS. 28A and 28B are sectional explanatory views illustrating a shape of the through-hole with which the electrode mixture layer is easy to drop.
Figure 28B:
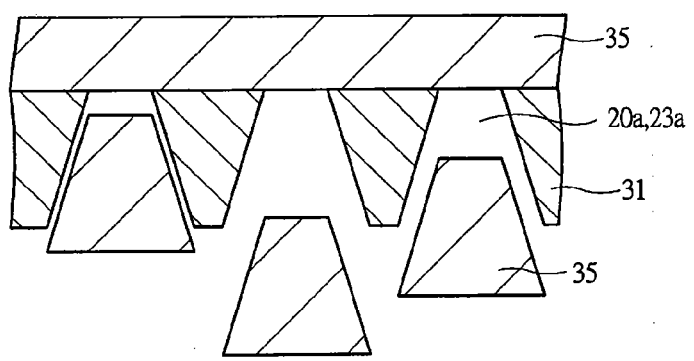

FIGS. 28A and 28B illustrate the state in which the electrode mixture layer drops after the film material serving as the blocking layer is peeled. As illustrated in FIG. 28A, for example, the vertical through-holes 20a and 23a having the straight cross-sectional shape in the penetration direction are formed on the current-collector material 31. The through-holes 20a and 23a are filled with the electrode mixture layer 35. However, the filled electrode mixture layer 35 may be easy to drop from the through-holes 20*a* and 23*a* as illustrated in FIG. 28A.

The electrode mixture layer portion 35*a* (35) that is filled in the through-holes 20*a* and 23*a* and that drops from the through-holes 20*a* and 23*a* may be easy to drop, because the inner wall surface of each of the through-holes 20*a* and 23*a* is formed to be vertical in the penetration direction. This is because the drop-side open surface θ from which the filled electrode mixture layer portion 35*a* may drop is formed similarly to the filled-side open surface θ1. Further, the side wall of the drop-side open surface θ and the side wall of the filled-side open surface θ1 are linearly linked. Specifically, the present inventors have considered that the electrode mixture layer drops because there is no hook portion, which prevents the electrode mixture layer portion 35*a* from dropping, formed on the inside in the penetration direction of the through-hole.

The drop-side open surface θ means the open surface of the through-hole that is formed on the current-collector material laminated on the film material and that faces the film material serving as the blocking layer. In other words, the drop-side open surface θ can be configured to be the open surface formed at the other end portion of the through-hole from the end, from which the electrode slurry is applied, in the penetration direction of the through-hole. The filled-side open surface θ1 is the open surface formed on the surface of the current-collector material on which the electrode slurry is applied. The electrode slurry is applied from the filled-side open surface θ1, whereby the electrode slurry is filled in the through-hole.

On the other hand, the electrode mixture layer portion 35*a* may be extremely easy to drop in the case shown in FIG. 28B, like the case in FIG. 28A. In the configuration in FIG. 28B, the drop-side open surface θ is formed to be larger than the filled-side open surface θ1. Further, the side face linking the drop-side open surface θ and the filled-side open surface θ1 is formed into a linear taper shape. Therefore, the through-hole has an internal configuration with which the electrode mixture layer portion 35*a* may be easy to drop.

In view of this, the present inventors have considered that some hook portion that can prevent the electrode mixture layer portion 35*a* from dropping is formed in the through-hole along the penetration direction. Examples of the hook portions include irregularities formed at the inner side face of the through-hole. The irregularities can be formed by roughening the inner side face of the through-hole, when the through-hole is formed by the etching. For example, the irregularities can be formed by appropriately selecting etching solution or etching speed. The side face at the side of the front surface can be made rough without making it smooth. The rough inner sidewall of the through-hole functions as the hook portion of the electrode mixture layer and serves as the drop-preventer.

Figure 29A:
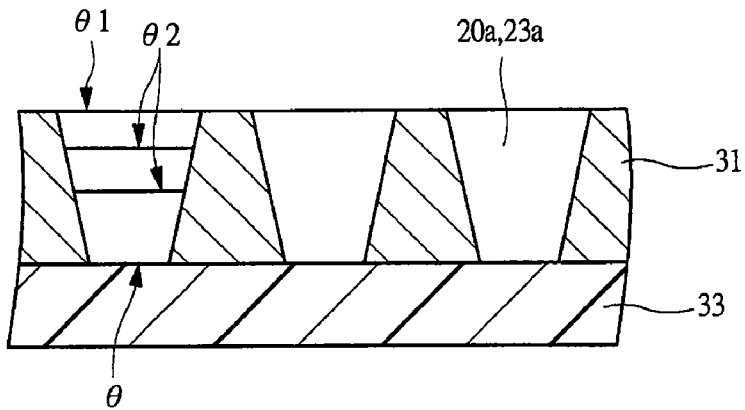
FIGS. 29A to 29C are explanatory views illustrating drop-preventer provided in the through-hole and the modification thereof.
Figure 29B:
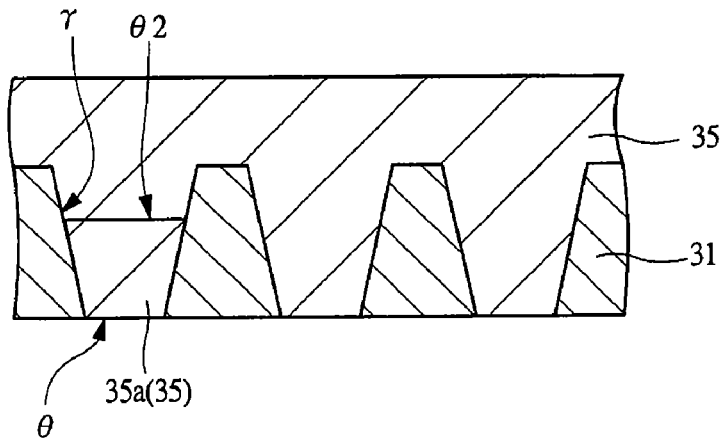
Figure 29C:
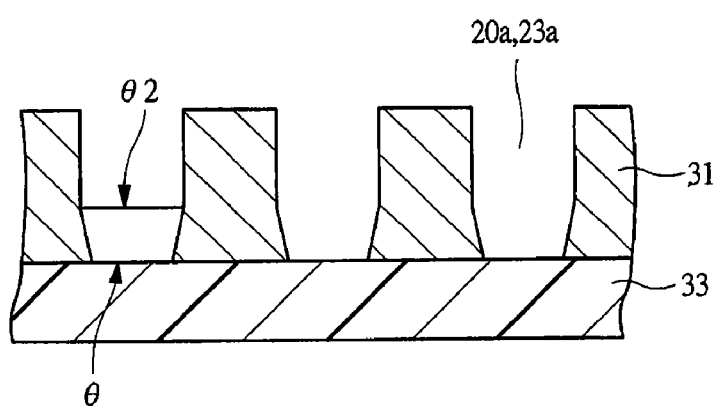

Alternatively, as illustrated in FIG. 29A, the size of the drop-side open surface θ and the size of a non-drop-side open surface θ2, which is different from the drop-side open surface θ, are made different. Specifically, the sectional shape of the non-drop-side open surface θ2, which is set on a hypothetical plane formed by cutting the through-hole in parallel with the drop-side open surface θ at an arbitrary position in the penetration direction is set larger than the drop-side open surface θ. Since the through-holes 20*a* and 23*a* are formed to have the configuration described above, there is less chance that the electrode mixture layer portion 35*a* in the through-hole is dropped as shown in FIGS. 29A to 29C. The electrode mixture layer portion 35*a* is hooked by the peripheral inner surface γ of the through-hole at the non-drop-side open surface θ2, which prevents the electrode mixture layer portion 35*a* from dropping.

The through-holes 20*a* and 23*a* are formed on the current-collector material 31 laminated on the film material 33 serving as the blocking layer. Although not shown, the current-collector material 32 is provided on the film material 33 so as to be opposite to the current-collector material 31. The current-collector material 32 also has the through-holes 20*a* and 23*a* formed thereon.

The sectional shapes effective for preventing the electrode mixture layer portion from dropping include, for example, the sectional configuration of the through-holes 20*a* and 23*b* as illustrated in FIG. 29C. FIG. 29C illustrates the configuration having a straight side face and a tapered side face in which the leading portion is narrow along the penetration direction of the through-hole. The non-drop-side open surface θ2 where the straight side face and the tapered side face cross with each other is larger than the drop-side open surface θ. Therefore, the electrode mixture layer portion 35*a* is hooked by the inner side face of the through-hole at the non-drop-side open surface θ2, which prevents the electrode mixture layer portion from dropping. The through-holes 20*a* and 23*a* having the sectional configuration described above can be formed by plural etching processes, for example.

The straight portion of the through-holes 20*a* and 23*a* in FIG. 29C is formed by an anisotropic etching process for forming the straight through-holes 20*a* and 23*a* as described previously. Thereafter, the tapered portion is formed by an isotropic etching process. AS described above, the through-holes 20*a* and 23*a* illustrated in FIG. 29C can be formed with plural etching processes.

Figure 30A:
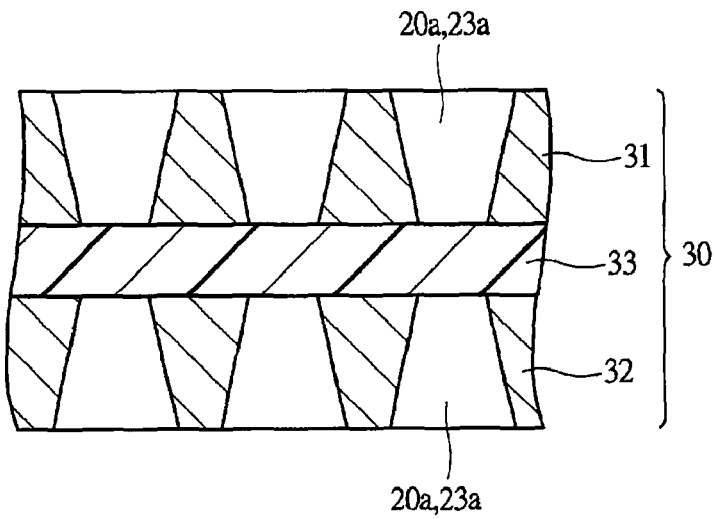
FIGS. 30A to 30D are explanatory views explaining one example of the drop-preventer and the function thereof.

The portion where the electrode mixture layer portion 35*a* is hooked can be formed in the through-holes 20*a* and 23*a* without performing plural etching processes. For example, the etching process can be performed without using the means for forming the straight sectional shape, which is currently executed. In this case, the portion that is brought into contact with the etching solution for longer time is more etched, whereby the tapered sectional shape as illustrated in FIG. 30A is formed. The through-hole 20*a* and 23*a* having the configuration described above is provided on the current-collector material 31 laminated on the film material 33 serving as the blocking layer.

The current-collector material 32 is provided on the film material 33, on which the current-collector material 31 having the above-mentioned configuration is formed, whereby the current-collector laminate unit 30 is formed, as illustrated in FIG. 30A. The current-collector material 32 also has the through-holes 20*a* and 23*a* formed thereon having the tapered shape like the current-collector material 31. In the figure, the open surfaces of the through-holes 20*a* and 23*a*, which are formed on the current-collector materials 31 and 32 and oppose to each other through the film material 33, are shifted from each other as described in the embodiment 2. If it is not intended to enhance the strength of the current-collector laminate unit, the positions of the open surfaces of the through-holes 20*a* and 23*a* are not necessarily shifted from each other.

Figure 30B:
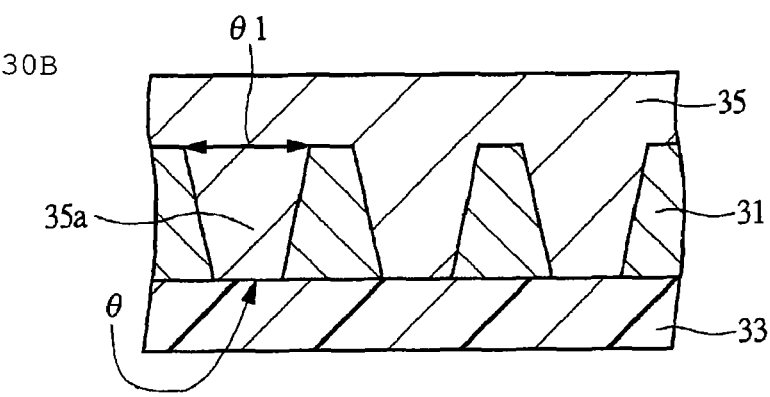

FIG. 30B illustrates only the side of the current-collector material 31 laminated on the film material 33 serving as the blocking layer, but does not illustrate the side of the current-collector material 32. When the etching process is performed on the current-collector material 31 without employing the means for forming the straight sectional shape as described above, the isotropic etching is performed. With the isotropic etching, the drop-side open surface θ facing the film material 33 is formed to be smaller than the filled-side open surface θ1.

In the hole configuration described above, the surrounding side face is formed to have a tapered sectional shape in which the drop-side open surface θ is linearly linked to the filled-side open surface θ1. The electrode slurry is applied and filled in the through-holes 20a and 23a thus formed, and then dried, whereby the electrode mixture layer portion 35a is filled therein.

Figure 30C:
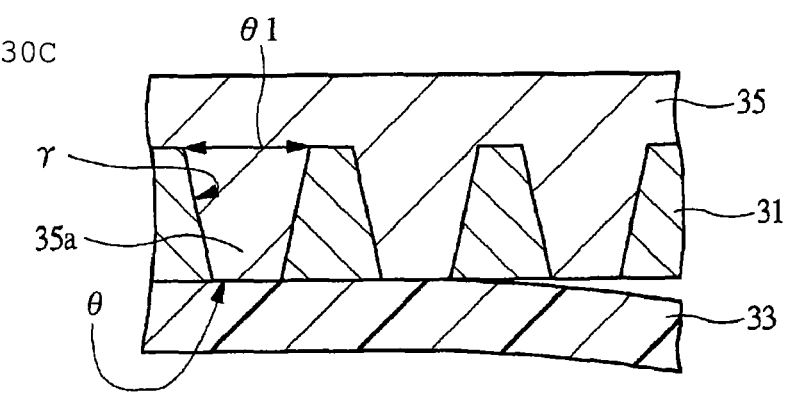

The film material 33 serving as the blocking layer is peeled as illustrated in FIG. 30C after the electrode mixture layer portion 35a is filled in the through-holes 20a and 23a as described above. In this case, the electrode mixture layer portion 35a at the peripheral surface side is hooked by the side face portion of the inner surface γ of the through-holes 20a and 23a, with the result that the electrode mixture layer portion 35a does not drop from the drop-side open surface θ. Even if the film material 33 is peeled, the electrode mixture layer portion 35a is prevented from being dropped from the drop-side open surface θ, although it is somewhat pulled toward the film material 33. Specifically, since the drop-side open surface θ is the smallest in the through-hole, even if the surrounding side face is formed into a straight shape, the electrode mixture layer portion 35a filled in the through-holes 20a and 23a is hooked by the side face, so that it is prevented from being dropped. In other words, the side face formed into a tapered shape toward the drop-side open surface θ in such a manner that the drop-side open surface θ is narrower becomes effective drop-preventer serving as hooking part in this configuration.

The drop-preventer can be configured by forming the tapered shape toward the film material 33 in the penetration direction of the through-hole. Alternatively, it can be said to be the configuration in which the tapered shape is formed from the filled-side open surface θ1, which is the surface from which the electrode slurry to be applied is filled in the through-hole, toward the other open surface that is the drop-side open surface θ. The tapered shape can be formed on the entire peripheral surface of the inner surface of the through-hole, or can be formed on a part of the peripheral surface. Further, the tapered shape can be formed in all directions in the penetration direction of the through-hole, or can be formed in one direction.

Figure 30D:
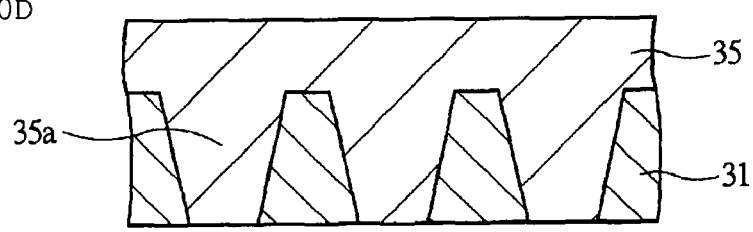

Even after the film material 33 is completely peeled, the electrode mixture layer portion 35a remains in the through-holes 20a and 23a as illustrated in FIG. 30D. Specifically, the electrode mixture layer portion 35a does not drop. Therefore, the ion conduction property through the holes is uniformly maintained in the current collectors produced by cutting the current-collector material, provided with the through-holes thus configured, into individual pieces. Accordingly, the doping function of the electrode can be uniformly maintained, even when the electrodes are formed by using the current collectors above.

The above-mentioned description is made on the assumption that the plural current-collector materials are laminated through the film material serving as the blocking layer as described in the embodiment 1. However, this embodiment is applicable to the configuration in which a single current-collector material is laminated on the film material or the like.

The configuration described above can be described as follows as a technical scope. Specifically, as a technical scope 1, it is a current collector that is used for an electrode and has a through-hole, wherein the through-hole is provided with drop-preventer of an electrode mixture layer filled at the inner surface of the through-hole. As a technical scope 2, in the current collector according to the technical scope 1, the drop-preventer is configured such that an open surface of an end of the through-hole, which is the end from the side where the electrode slurry is applied in the penetration direction of the through-hole, is smaller than the other open surface of the through-hole hypothetically formed on a plane that is cut in parallel with the open surface of the end of the through hole. As a technical scope 3, in the current collector according to the technical scope 1, the drop-preventer is configured to have a tapered shape from the side where the electrode slurry is applied to the open surface at the other end of the through-hole. As a technical scope 4, in the current collector according to any one of the technical scopes 1 to 3, the current collector is produced from laminated current-collector materials provided with the through-hole. As a technical scope 5, it is a manufacturing method of a current collector that is used for an electrode and has a through-hole, wherein a current-collector material provided with drop-preventer of an electrode mixture layer filled in the through-hole is cut into individual pieces. As a technical scope 6, in the manufacturing method of a current collector according to the technical scope 5, the drop-preventer is configured such that an open surface of an end of the through-hole, which is the end from the side where the electrode slurry is applied in the penetration direction of the through-hole, is smaller than the other open surface of the through-hole hypothetically formed on a plane that is cut in parallel with the open surface of the end of the through hole. As a technical scope 7, in the manufacturing method of a current collector according to the technical scope 5, the drop-preventer is configured to have a tapered shape from the side where the electrode slurry is applied to the open surface at the other end of the through-hole. As a technical scope 8, in the manufacturing method of a current collector according to any one of the technical scopes 5 to 7, the through-hole is formed with the plural current-collector materials being laminated. As a technical scope 9, it is an electrode employing a current collector having a through-hole, wherein the current collector described in any one of the technical scopes 1 to 4 or the current collector produced by the manufacturing method of a current collector described in any one of the technical scopes 5 to 8 is employed. As a technical scope 10, it is an electric storage device having an electrode, wherein the electrode employs the current collector described in any one of the technical scopes 1 to 4 or the current collector produced by the manufacturing method of a current collector described in any one of the technical scopes 5 to 8. As a technical scope 11, it is a configuration for preventing an electrode mixture layer from dropping off from a through-hole formed on a current collector, wherein a hook portion where the electrode mixture layer is hooked is provided on the inner surface of the through-hole in order to prevent the electrode mixture layer filled in the through-hole from dropping. As a technical scope 12, in the configuration of preventing the electrode mixture layer from dropping from the through-hole as described in the technical scope 11, the hook portion is the other open surface, which is larger than the open surface at the end of the through-hole at the side where the electrode slurry is applied in the penetration direction of the through-hole, and which is the open surface in the through-hole hypothetically formed on a plane cut in parallel with the open surface at the end of the through hole where the electrode slurry is applied. As a technical scope 13, in the configuration of preventing the electrode mixture layer from dropping from the through-hole as described in the technical scope 11, the hook portion is a tapered portion from the open surface, where the electrode slurry is applied, of the through-hole to the other open surface of the through-hole.

Embodiment 4

In the present embodiment, the planar shape of the open surface of the through-hole will be described. The planar shape of the open surface of the through-hole is considered to be important as the drop-preventer. Specifically, when the blocking layer such as the film material or the like is peeled, it is almost unlikely that the blocking layer is peeled below in the vertical direction with respect to the surface of the current-collector material. It is considered that the blocking layer is peeled with some directivity. For example, when the film material is peeled from one end of the long-sized current-collector material in the longitudinal direction, the longitudinal direction is assumed to be the peeling direction. In this case, the planar shape of the open surface of the through-hole, which is formed on the current-collector material and faces the film material, is preferably formed into a shape considering the peeling direction. It must be preferable that the open surface has a planar shape having anisotropy rather than a planar shape having isotropy around 360 degrees.

For example, it is considered that the shape in the peeling direction and the shape in the direction orthogonal to the peeling direction are made different. Specifically, it is considered that a rectangular shape, elliptic shape, or the like is preferable, compared to a square, circle, regular polygon, or the like. If the easiness in peeling is prioritized, it is preferable that the length in the peeling direction is shorter than the widthwise direction orthogonal to the length in the peeling direction. On the contrary, if prevention of dropping of the electrode mixture layer in the through-hole to drop is prioritized, it is preferable that the length in the peeling direction is longer than the widthwise direction orthogonal to the length in the peeling direction. Specifically, the open surface can be formed into a plane shape having different length and width, wherein the longitudinal direction thereof can agree with the conveying direction of the current-collector material, or the peeling direction. As the case can be, the longitudinal direction can diagonally cross the peeling direction.

Conceivably, a shape having corners allows the electrode mixture layer filled in the through-hole to be hooked so as to prevent the electrode mixture layer from dropping, compared to a complete circle. The corners preferably have an acute shape in order to prevent the electrode mixture layer from dropping. For example, a regular polygon is more effective to prevent the electrode mixture layer from dropping than a complete circle, a square is more effective among regular polygons, and an equilateral triangle is more effective than the square. A more preferable shape can be obtained by adding the concept of the ratio of the longitudinal and widthwise directions to the order of priority described above. Specifically, a shape having high symmetry such as a regular polygon, square, equilateral triangle, etc., can be modified into a shape having low symmetry. For example, the shape having high symmetry can be modified into an ellipse, rectangle, isosceles triangle, etc., whereby higher effect can be obtained.

The present invention is not limited to the above-mentioned embodiments, but various modifications are possible without departing from the scope of the present invention. For example, the electrode obtained by the manufacturing method according to the embodiment 1 of the present invention is applicable not only to a lithium ion battery or lithium ion capacitor but also to various types of battery or capacitor.

In the case of FIG. 5A or 9A, the current-collector laminate units 30 and 50 are formed by using two current-collector materials 31 and 32. However, the current-collector laminate unit can be formed by laminating three or more current-collector materials. For example, a new current-collector material can be laminated on the surface of the current-collector laminate unit 30 shown in FIG. 5A. A new current-collector material can be laminated on the surface of the current-collector laminate unit 50 shown in FIG. 9A.

In the aforesaid description, the resist removing step for removing the resist layers 34, 51, and 58 is executed. However, the resist removing step can be omitted, if the resist layers 34, 51, and 58 have conductivity and do not affect the active material or the electrolyte solution.

What is claimed is:

1. A manufacturing method of an electrode provided with a perforated current collector, comprising:
    a current collector laminating step in which plural current-collector materials are laminated on either of both and any of the surfaces of a block layer so as to form a current-collector laminate unit;
    a protection layer formation step for forming a protection layer having a predetermined pattern on a front surface of the current-collector laminate unit;
    an etching step for performing an etching process on the current-collector laminate unit having the protection layer formed thereon so as to form through-holes on each of the current-collector materials;
    a first application step in which an electrode slurry is applied onto the front surface of the current-collector laminate unit on which the through-holes are formed;
    a current collector peeling step in which the current-collector material having the electrode slurry applied thereon is peeled from the current-collector laminate unit; and
    a second application step in which an electrode slurry is applied onto a back surface of the current-collector material peeled from the current-collector laminate unit.

2. A manufacturing method of an electrode according to claim 1, wherein
    the current-collector material is laminated on both the surfaces of the block layer in the current-collector laminating step,
    the protection layers having the predetermined pattern are formed on both the surfaces of the current-collector laminate unit in the protection layer formation step, and
    the through-holes are formed on each of the current-collector materials from both the surfaces of the current-collector laminate unit in the etching step.

3. A manufacturing method of an electrode according to claim 1, wherein
    plural current-collector materials are directly laminated in the current collector laminating step,
    the block layer is formed over an entire surface of the current-collector laminate unit while the protection layer having the predetermined pattern is formed on the other surface of the current-collector laminate unit in the protection layer formation step, and
    the through-holes are formed on each of the current-collector materials from the surface of the current-collector laminate unit, on which the protection layer having the predetermined pattern is formed, in the etching step.

4. A manufacturing method of an electrode according to claim 1, wherein
    the through-holes formed on each of the plural laminated current-collector materials are formed so as to be opposite to each other, and
    the open surfaces of the through-holes, which are formed so as to be opposite to each other, are shifted from each other.

5. A manufacturing method of an electrode according to claim 1, wherein
    each of the through-holes formed on each of the laminated plural current-collector materials has drop-preventer of an electrode mixture layer provided on the inner surface of the through-hole.

6. A manufacturing method of an electrode according to claim 5, wherein
the drop-preventer is configured by forming the open surface at the end of the through-hole, which is at the side in the penetration direction of the through-hole from the side where the electrode slurry is applied, to be smaller than the other open surface of the through-hole on a hypothetical plane formed by cutting the through-hole in parallel with the open surface.

7. A manufacturing method of an electrode according to claim 5, wherein
the drop-preventer is a tapered shape from the open surface at the side where the electrode slurry is applied toward the other open surface of the through-hole.

* * * * *